US012686929B2

(12) United States Patent
Chen et al.

(10) Patent No.: US 12,686,929 B2
(45) Date of Patent: Jul. 21, 2026

(54) METHOD OF INHIBITING CORROSION OF A METAL IN AN INDUSTRIAL WATER SYSTEM

(71) Applicant: Ecolab USA Inc., St. Paul, MN (US)

(72) Inventors: Bingzhi Chen, Naperville, IL (US); Malgorzata A. Krawczyk, Chicago, IL (US); Michael P. Weberski, Jr., Sugar Grove, IL (US)

(73) Assignee: Ecolab USA Inc., St. Paul, MN (US)

( * ) Notice: Subject to any disclaimer, the term of this patent is extended or adjusted under 35 U.S.C. 154(b) by 425 days.

(21) Appl. No.: 18/337,610

(22) Filed: Jun. 20, 2023

(65) Prior Publication Data

US 2023/0416128 A1　Dec. 28, 2023

Related U.S. Application Data

(60) Provisional application No. 63/354,829, filed on Jun. 23, 2022.

(51) Int. Cl.
C23F 11/18 (2006.01)
C02F 5/14 (2023.01)
(Continued)

(52) U.S. Cl.
CPC ............ C23F 11/187 (2013.01); C02F 5/145 (2013.01); C23F 11/185 (2013.01); (Continued)

(58) Field of Classification Search
None
See application file for complete search history.

(56) References Cited

U.S. PATENT DOCUMENTS 3,837,803 A * 9/1974 Carter .................... C23F 11/08
422/15
4,512,552 A 4/1985 Katayama et al.
(Continued)

FOREIGN PATENT DOCUMENTS

CA 2582888 A1 3/2007
CN 1880245 A 12/2006
(Continued)

OTHER PUBLICATIONS

Zinc Phosphate product (pp. 1-8, accessed online at https://atamankimya.com/sayfalar.asp?LanguageID=2&cid=3&id=8&id2=13203#:~:text=Zinc%20phosphate%20is%20insoluble%20in.particularly%20for%20iron%20and%20steel.) (Year: 2015).*
(Continued)

*Primary Examiner* — Clare M Perrin
(74) *Attorney, Agent, or Firm* — Leydig, Voit & Mayer, Ltd.

(57) ABSTRACT

The invention provides a method of inhibiting corrosion of a metal in an industrial water system, the method comprising: (i) treating water of the industrial water system with a corrosion inhibiting-effective amount of a phosphorus-based treatment program comprising a phosphorus-based compound to provide a first treated industrial water, and (ii) treating the first treated industrial water with a corrosion inhibiting-effective amount of a metal-containing treatment program to provide a second treated industrial water, to inhibit corrosion of metal in the system.

20 Claims, 20 Drawing Sheets

(51) Int. Cl.

| | |
|---|---|
| *C02F 5/08* | (2023.01) |
| *C02F 5/12* | (2023.01) |
| *C02F 11/14* | (2019.01) |
| *C02F 103/02* | (2006.01) |
| *C23F 11/12* | (2006.01) |
| *C23F 11/14* | (2006.01) |

(52) U.S. Cl.
CPC ............ *C23F 11/188* (2013.01); *C02F 5/083* (2013.01); *C02F 5/125* (2013.01); *C02F 2103/023* (2013.01); *C02F 2303/08* (2013.01); *C23F 11/12* (2013.01); *C23F 11/14* (2013.01)

(56) References Cited

U.S. PATENT DOCUMENTS

| | | | |
|---|---|---|---|
| 4,749,550 | A | 6/1988 | Goldie et al. |
| 5,130,052 | A | 7/1992 | Kreh et al. |
| 5,248,438 | A | 9/1993 | Perez |
| 5,342,540 | A | 8/1994 | Perez |
| 5,344,590 | A | 9/1994 | Carter et al. |
| 5,468,393 | A | 11/1995 | Zidovec et al. |
| 5,531,934 | A | 7/1996 | Freeman et al. |
| 5,750,070 | A | 5/1998 | Tang et al. |
| 5,976,414 | A | 11/1999 | Bedford et al. |
| 6,200,672 | B1 | 3/2001 | Tadokoro et al. |
| 6,537,678 | B1 | 3/2003 | Putnam et al. |
| 6,572,789 | B1* | 6/2003 | Yang ..................... C23F 11/167 252/387 |
| 6,585,933 | B1 | 7/2003 | Ehrhardt et al. |
| 7,252,769 | B2 | 8/2007 | Dickinson |
| 7,341,677 | B2 | 3/2008 | Yu et al. |
| 7,507,480 | B2 | 3/2009 | Sugama |
| 7,759,419 | B2 | 7/2010 | Stoffer et al. |
| 8,025,840 | B2 | 9/2011 | Crovetto et al. |
| 8,367,162 | B2 | 2/2013 | Zhang et al. |
| 8,641,925 | B2 | 2/2014 | Poulet et al. |
| 9,290,851 | B2 | 3/2016 | Gill et al. |
| 10,000,858 | B2 | 6/2018 | Kurokawa et al. |
| 10,174,429 | B2 | 1/2019 | Kalakodimi et al. |
| 10,287,199 | B2 | 5/2019 | Hater et al. |
| 10,655,086 | B2 | 5/2020 | Cabanas et al. |
| 2006/0151394 | A1* | 7/2006 | Duke ...................... C23F 15/00 210/687 |
| 2006/0261313 | A1 | 11/2006 | Nakayama |
| 2015/0118103 | A1* | 4/2015 | Erickson ............... C23F 11/144 422/7 |
| 2015/0376041 | A1 | 12/2015 | Felipe et al. |
| 2016/0305028 | A1 | 10/2016 | Smith et al. |
| 2018/0030345 | A1 | 2/2018 | Gill et al. |
| 2019/0226094 | A1 | 7/2019 | Felipe et al. |
| 2022/0127730 | A1 | 4/2022 | Chen et al. |
| 2022/0127731 | A1* | 4/2022 | Clemens ............... C23F 11/182 |

FOREIGN PATENT DOCUMENTS

| | | |
|---|---|---|
| CN | 101805067 B | 8/2011 |
| CN | 102770583 A | 11/2012 |
| CN | 104355418 A | 2/2015 |
| EP | 1379473 B1 | 10/2011 |
| EP | 3063311 B1 | 4/2018 |
| GB | 1386746 A | 3/1975 |
| WO | WO 2000/066810 A1 | 11/2000 |
| WO | WO 2008/084503 A1 | 7/2008 |
| WO | WO 2017/078755 A1 | 5/2017 |
| WO | WO 2019/230757 A1 | 12/2019 |
| WO | WO 2022/076641 A1 | 4/2022 |

OTHER PUBLICATIONS

Curioni et al., "Formation of protective anodic oxides on aluminium by low voltage anodising in sulphuric acid with cerium nitrate and tartaric acid additions," *Int. J. Surf. Sci. Eng.*, 90: 290-297 (2012).

Cetiner et al., "The aqueous geochemistry of the rare earth elements. Part XIV. The solubility of rare earth element phosphates from 23 to 150° C.," *Chemical Geology*, 217: 147-169 (2005).

Firsching et al., "Solubility products of the trivalent rare-earth phosphates," *J. Chem. and Eng. Data*, 36(1): 93-95 (1991).

Liu et al., "Rare earth and yttrium phosphate solubilities in aqueous solution," *Geochimica et Cosmochimica Acta*, 61(8): 1625-1633 (1997).

Neo Water Treatment, "Chemistry of Rare Earth Elements in Wastewater," white papers downloaded from the Internet at https://neowatertreatment.com/chemistry-of-rare-earth-elements-in-wastewater/, 11 pp (Apr. 1, 2016).

European Patent Office, International Search Report in International Patent Application No. PCT/US2021/053890, mailed Jan. 31, 2022, 5 pp.

European Patent Office, Written Opinion in International Patent Application No. PCT/US2021/053890, mailed Jan. 31, 2022, 8 pp.

European Patent Office, International Search Report in International Patent Application No. PCT/US2023/068703, 4 pp. (Aug. 10, 2023).

European Patent Office, Written Opinion in International Patent Application No. PCT/US2023/068703, 5 pp. (Aug. 10, 2023).

Forsyth et al., "New 'green' corrosion inhibitors based on rare earth compounds," *Aust. J. Chem.*, 64: 812-819 (Mar. 23, 2011).

Lamaka et al., "Comprehensive screening of Mg corrosion inhibitors," *Corrosion Science*, 128: 224-240 (Jul. 25, 2017).

Terada et al., "Corrosion resistance of tartaric-sulfuric acid anodized AA2024-T3 sealed with Ce and protected with hybrid sol-gel coating," *Surface & Coatings Technology*, 372: 422-426 (May 2019).

Yuasa et al., "Effects of a Polyacrylic Acid and Polyacrylamide Mixture System on the Corrosion of Mild Steel in Cooling Water Systems," *J. of the Surface Finishing Society of Japan*, 51(11): 1148-1153 (Nov. 2000).

\* cited by examiner

1

METHOD OF INHIBITING CORROSION OF A METAL IN AN INDUSTRIAL WATER SYSTEM

CROSS-REFERENCE TO RELATED APPLICATIONS

This application claims priority to U.S. Provisional Patent Application No. 63/354,829, filed Jun. 23, 2022, which is incorporated by reference herein in its entirety.

BACKGROUND OF THE INVENTION

The increasing concern for protecting the environment, and more particularly the global waterways, has necessitated a change in the way we think about industrial water systems. Conventionally, industrial water systems (e.g., open loop cooling systems) have required chemical treatment programs heavy in zinc and/or phosphorous to help reduce the corrosion of the metals (e.g., mild steel) used to operate the industrial water system. Unfortunately, these chemical treatment programs are discharged into waterways, thereby raising concern about environmental pollution. Thus, chemical treatment programs that limit the amount of, or exclude, zinc and phosphorus are highly desirable.

However, in order to successfully control the corrosion of a metal in an industrial water system, certain corrosion standards must be met. For example, successful corrosion control is classified by the absence of localized corrosion and a general corrosion rate of less than about 2 mils per year (mpy), as measured on corrosion coupons or heat exchanger tubes.

Thus, there remains a need for water treatment methods to inhibit corrosion in industrial systems, which meet industrial standards but contain chemical components that are more environmentally friendly and/or limit the concentration of chemical components that are may not be regarded as environmentally friendly. The invention provides such methods. These and other advantages of the invention, as well as additional inventive features, will be apparent from the description of the invention provided herein.

BRIEF SUMMARY OF THE INVENTION

The invention provides a method of inhibiting corrosion of a metal in an industrial water system, the method comprising: (i) treating water of the industrial water system with a corrosion inhibiting-effective amount of a phosphorus-based treatment program comprising a phosphorus-based compound to provide a first treated industrial water, and (ii) treating the first treated industrial water with a corrosion inhibiting-effective amount of a metal-containing treatment program to provide a second treated industrial water, to inhibit corrosion of metal in the system.

2 ment) over the course of the phosphate-based treatment program used in the absence of a metal-containing treatment program.

Figure 3:
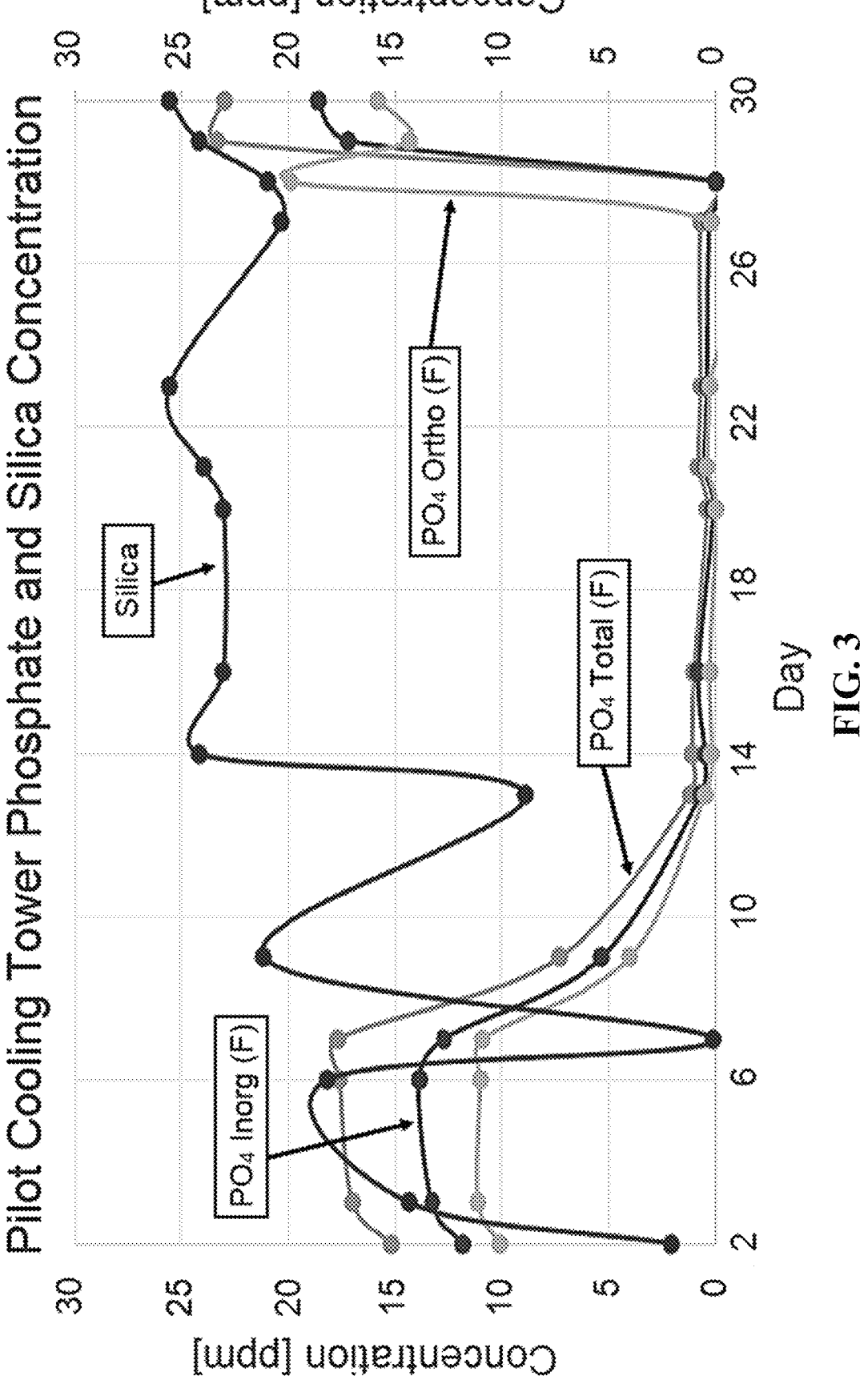

FIG. 3 depicts a time plot showing the total phosphate concentration (filtered (F) prior to measurement), inorganic phosphate concentration (filtered (F) prior to measurement), orthophosphate concentration (filtered (F) prior to measurement), and silica concentration of the phosphate-based treatment program used in the absence of a metal-containing treatment program 1.

Figure 4:
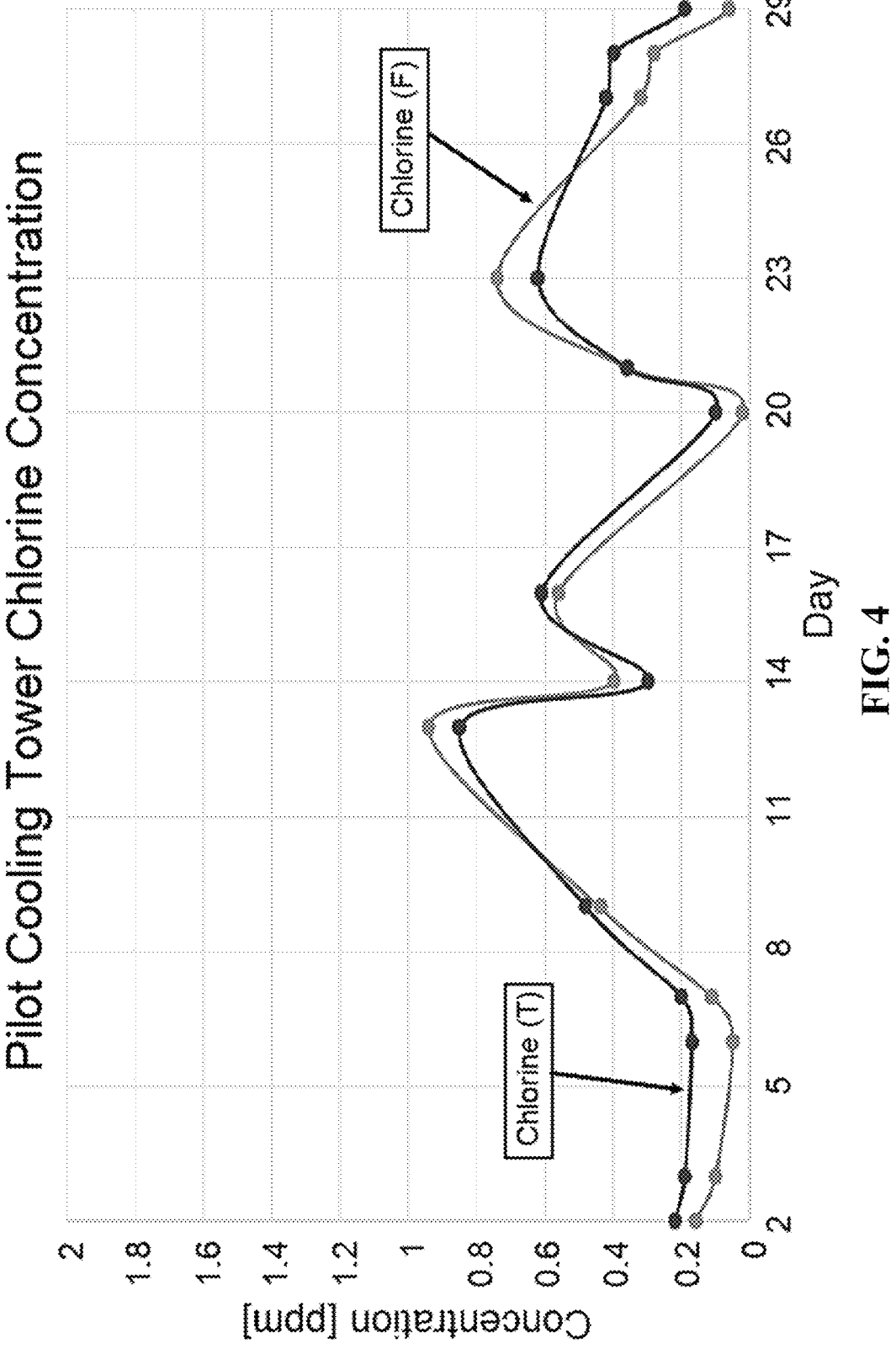

FIG. 4 depicts a time plot showing the free chlorine concentration (F) and total chlorine concentration (T) of the phosphate-based treatment program used in the absence of a metal-containing treatment program.

Figure 5:
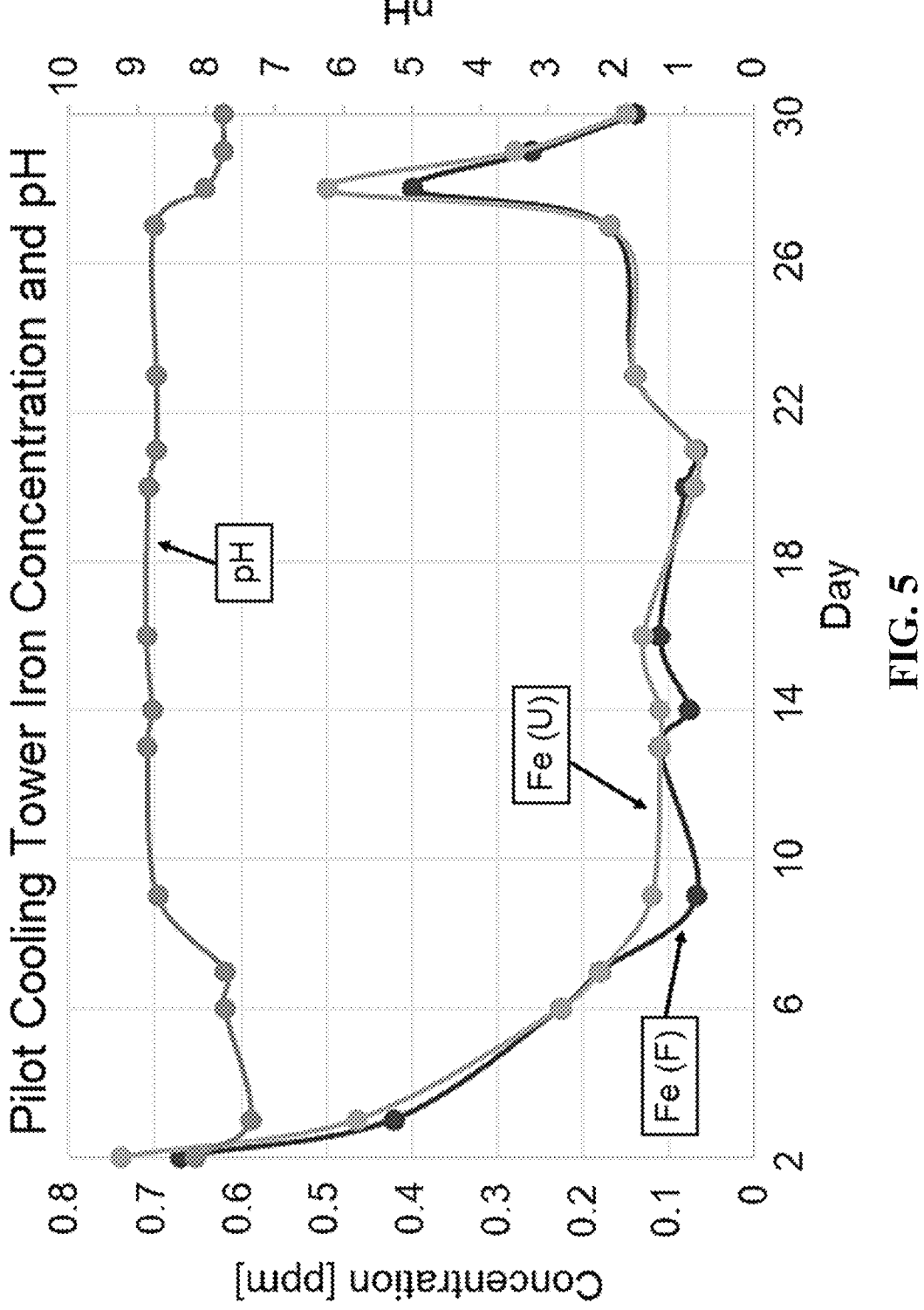

FIG. 5 depicts a time plot showing the iron concentration (filtered (F) prior to measurement and unfiltered (U)) and pH of the phosphate-based treatment program used in the absence of a metal-containing treatment program.

Figure 6:
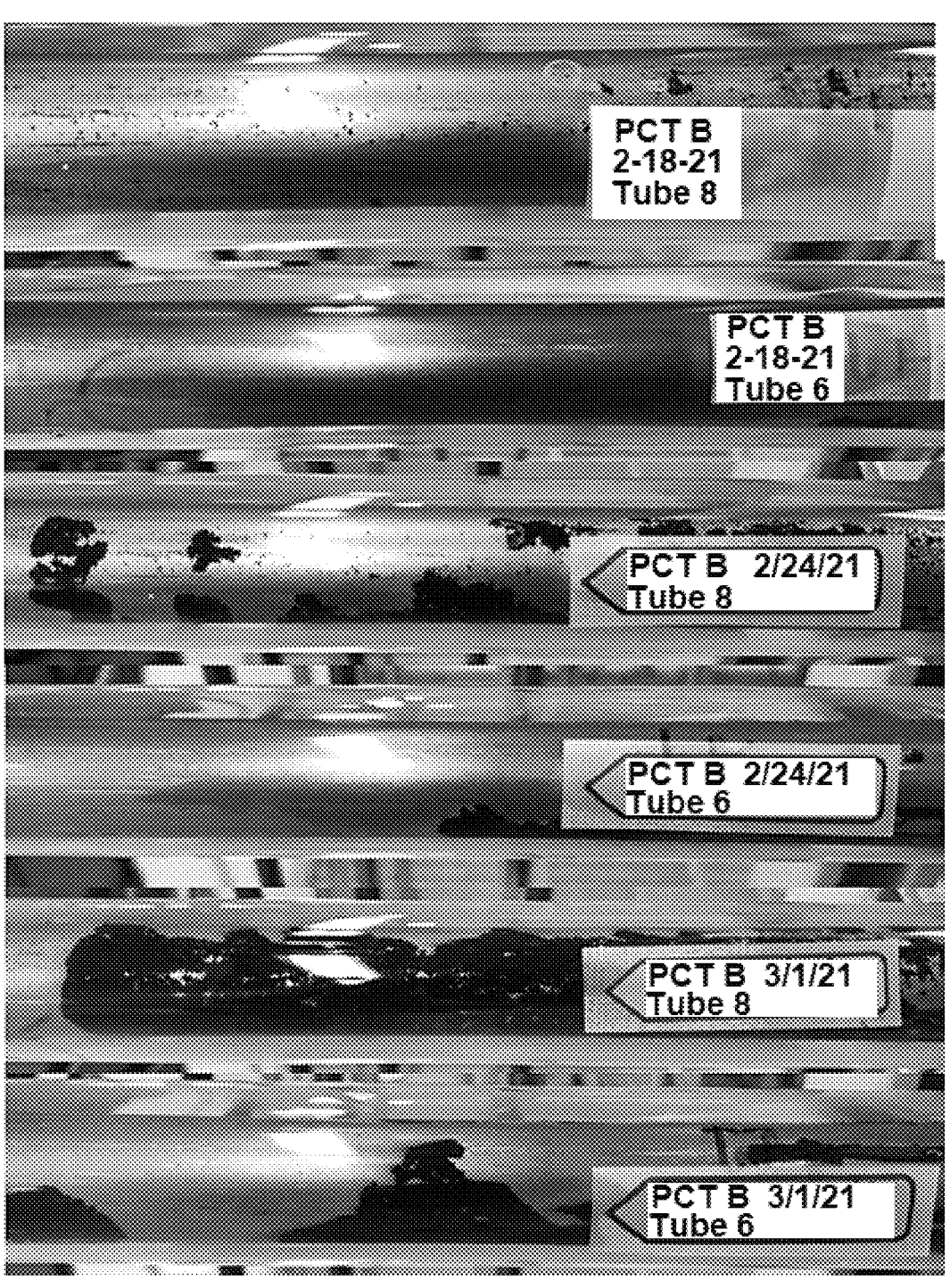

FIG. 6 shows the mild steel tubes of a pilot cooling tower for the phosphate-based treatment program used in the absence of a metal-containing treatment program.

Figure 7:
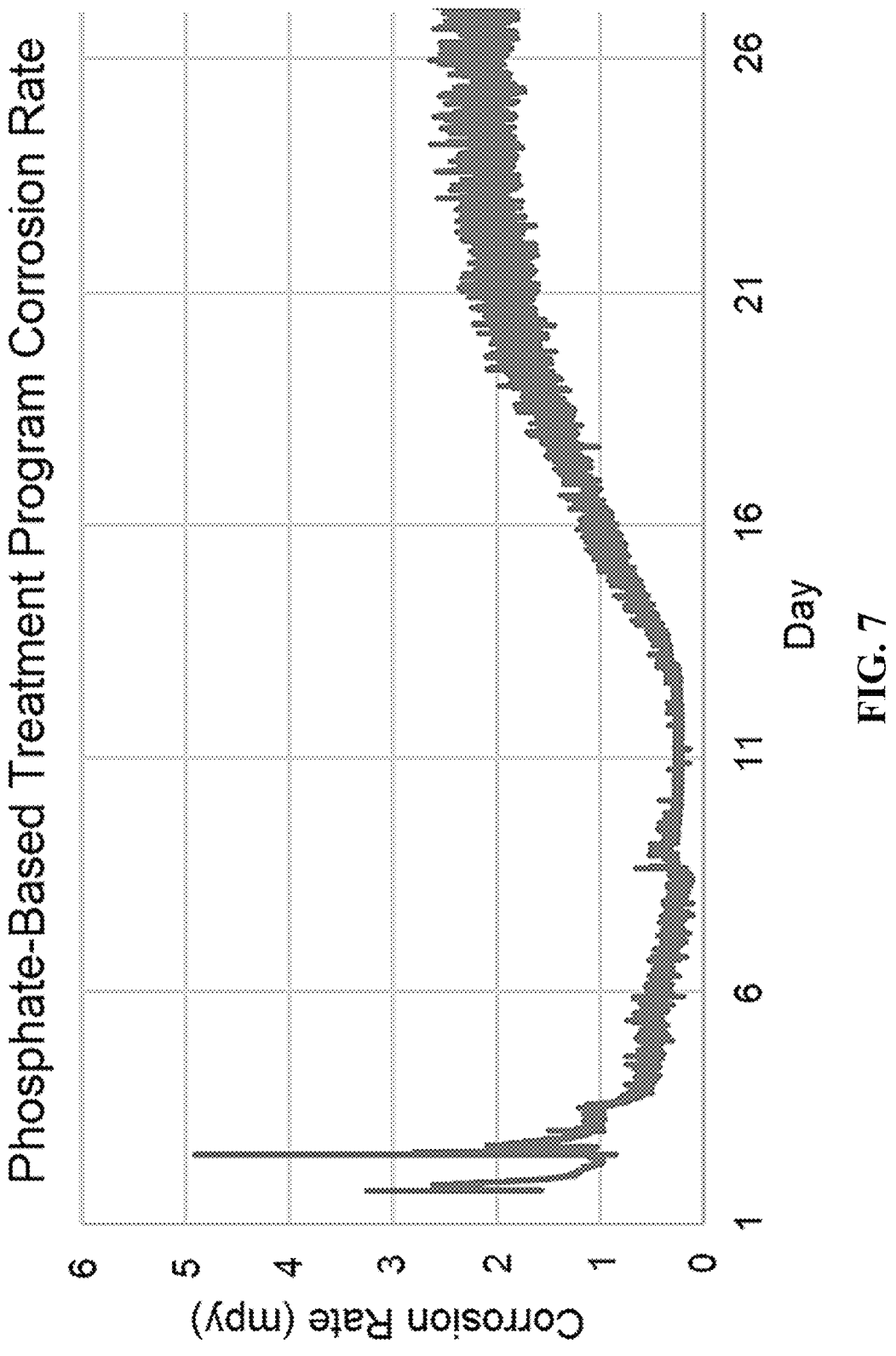

FIG. 7 depicts a time plot showing the corrosion rate (mpy), measured using linear polarization resistance (LPR) electrochemical analysis, of the phosphate-based treatment program used in the absence of a metal-containing treatment program.

Figure 8:
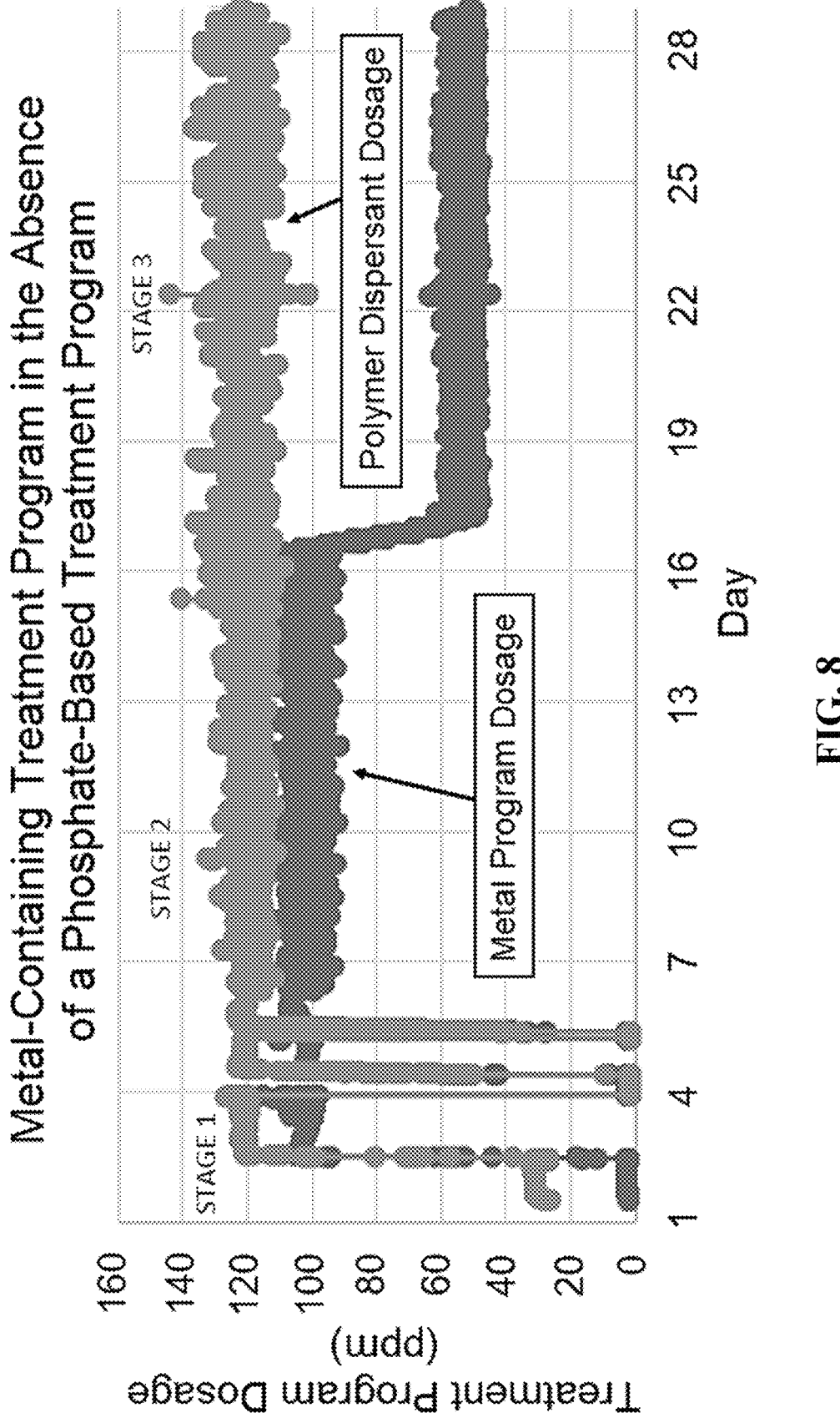

FIG. 8 depicts a time plot summarizing the metal program dosage and the polymer dispersant dosage of the metal-containing treatment program used in the absence of a phosphate-based treatment program.

Figure 9:
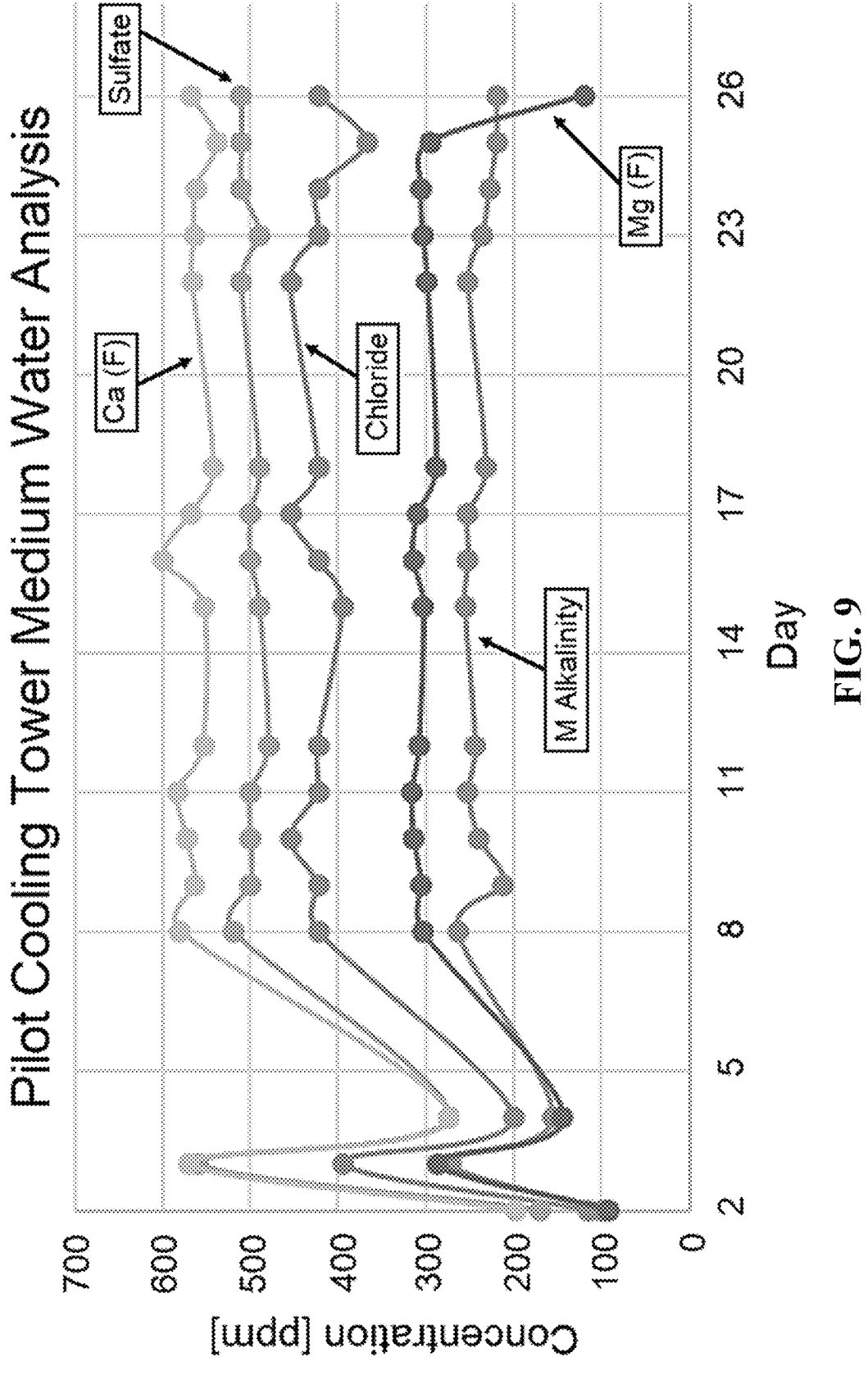

FIG. 9 depicts a time plot showing the M alkalinity concentration, chloride concentration, sulfate concentration, calcium concentration (filtered (F) prior to measurement), and magnesium concentration (filtered (F) prior to measurement) over the course of the metal-containing treatment program used in the absence of a phosphate-based treatment program.

Figure 10:
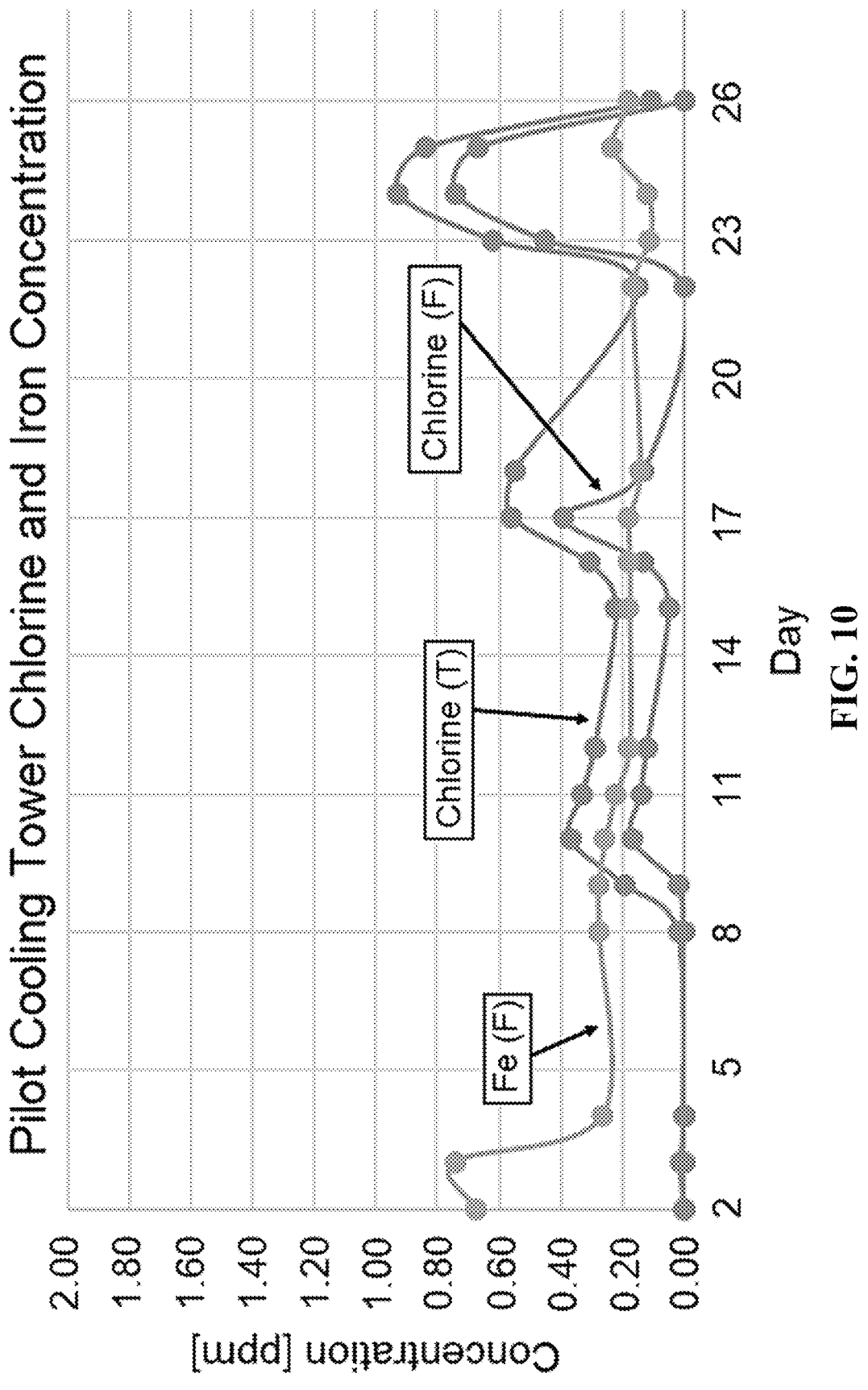

FIG. 10 depicts a time plot showing the free chlorine concentration (F) and total chlorine concentration (T) and the iron concentration (filtered (F) prior to measurement) of the metal-containing treatment program used in the absence of a phosphate-based treatment program.

Figure 11:
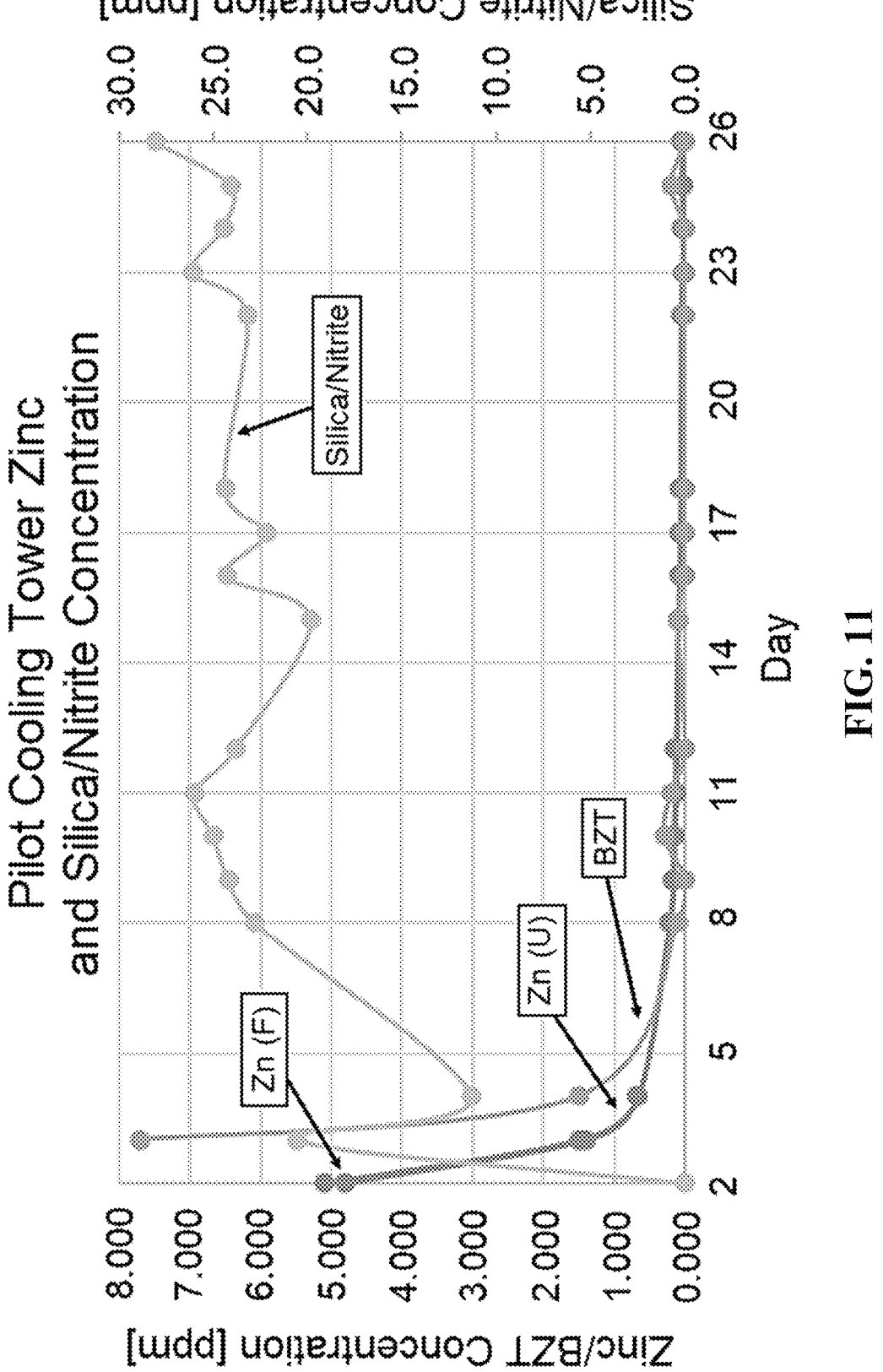

FIG. 11 depicts a time plot showing the zinc concentration (filtered (F) prior to measurement), zinc concentration (unfiltered (U)), BZT concentration, and silica/nitrite concentration of the metal-containing treatment program used in the absence of a phosphate-based treatment program.

Figure 12:
Figure 13:
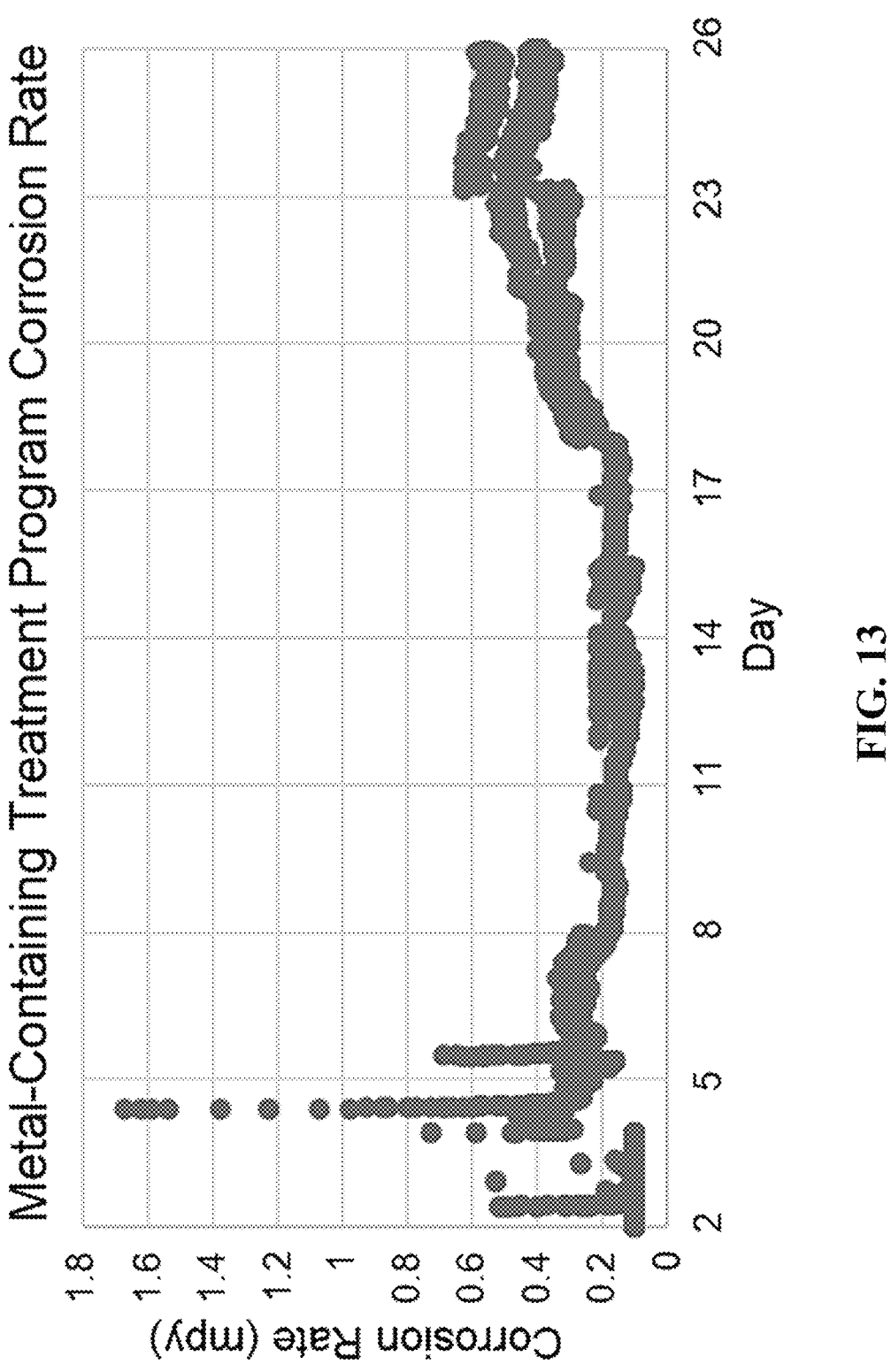

FIG. 12 shows the mild steel tubes of the pilot cooling tower for the metal-containing treatment program used in the absence of a phosphate-based treatment program FIG. 13 depicts a time plot showing the corrosion rate (mpy), measured using linear polarization resistance (LPR) electrochemical analysis, of the metal-containing treatment program used in the absence of a phosphate-based treatment program.

Figure 14:
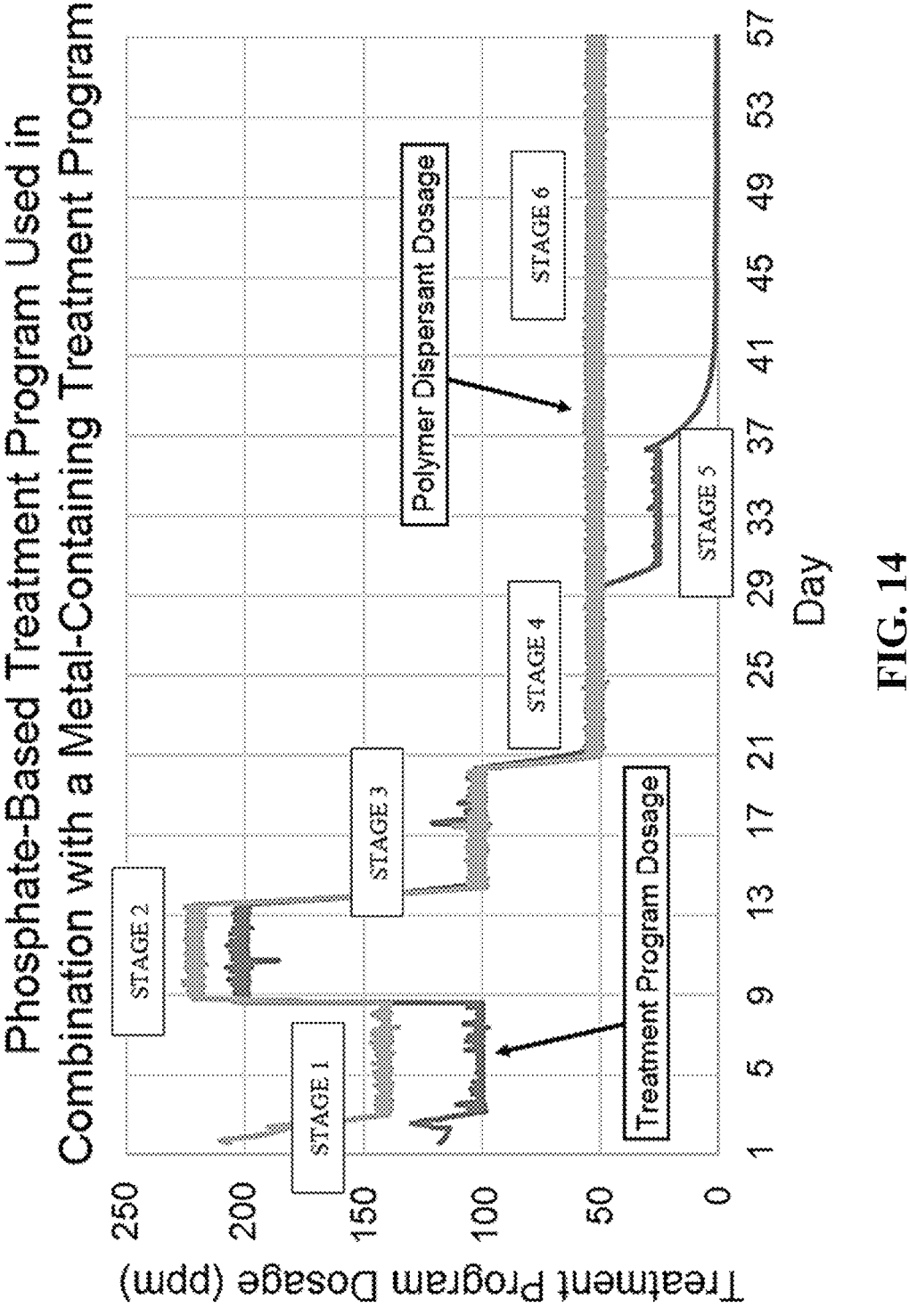

FIG. 14 depicts a time plot summarizing the treatment program dosage and the polymer dispersant dosage of the phosphate-based treatment program used in combination with a metal-containing treatment program.

Figure 15:
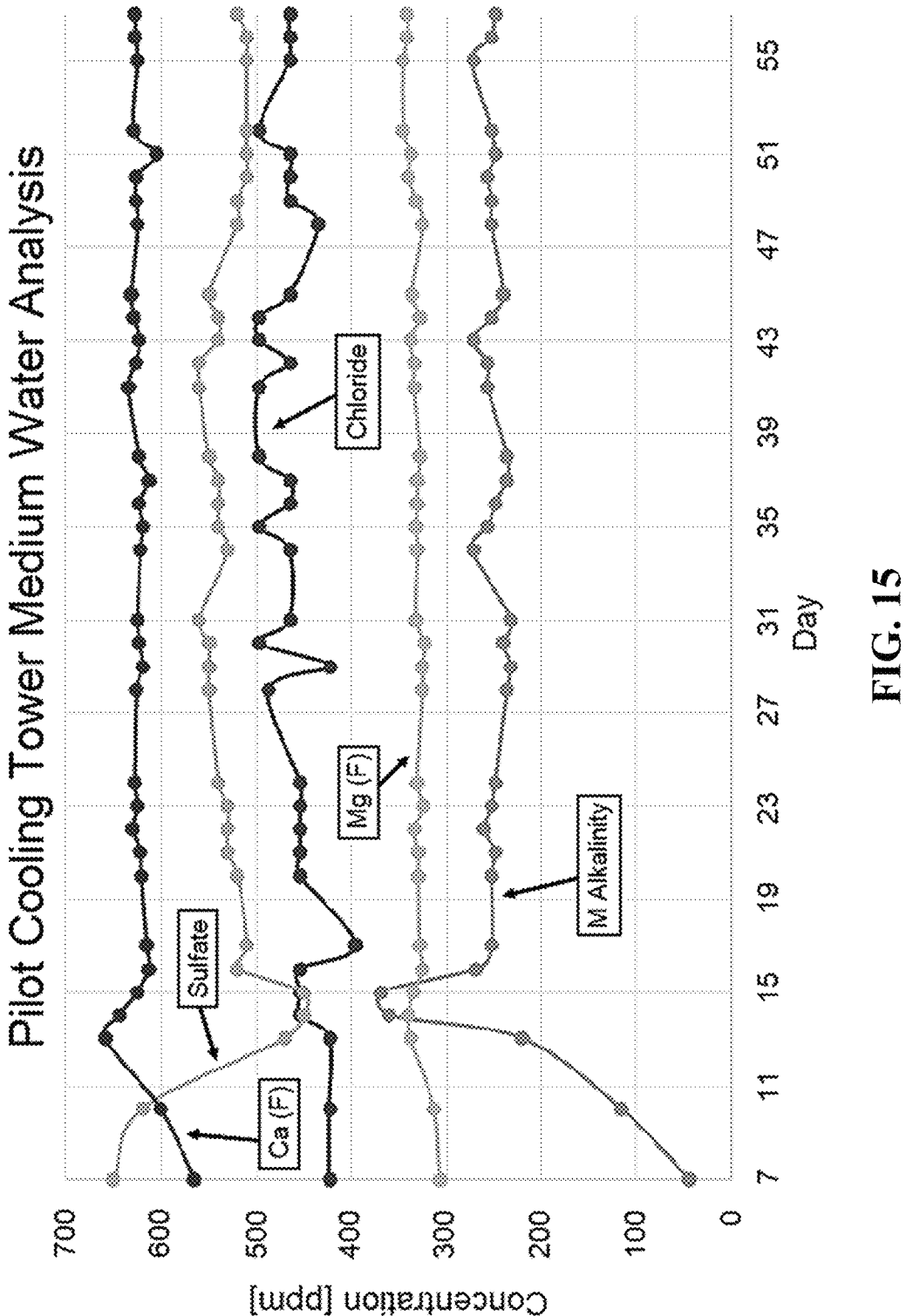

FIG. 15 depicts a time plot showing the M alkalinity concentration, chloride concentration, sulfate concentration, calcium concentration (filtered (F) prior to measurement), and magnesium concentration (filtered (F) prior to measurement) over the course of the phosphate-based treatment program used in combination with a metal-containing treatment program.

Figure 16:
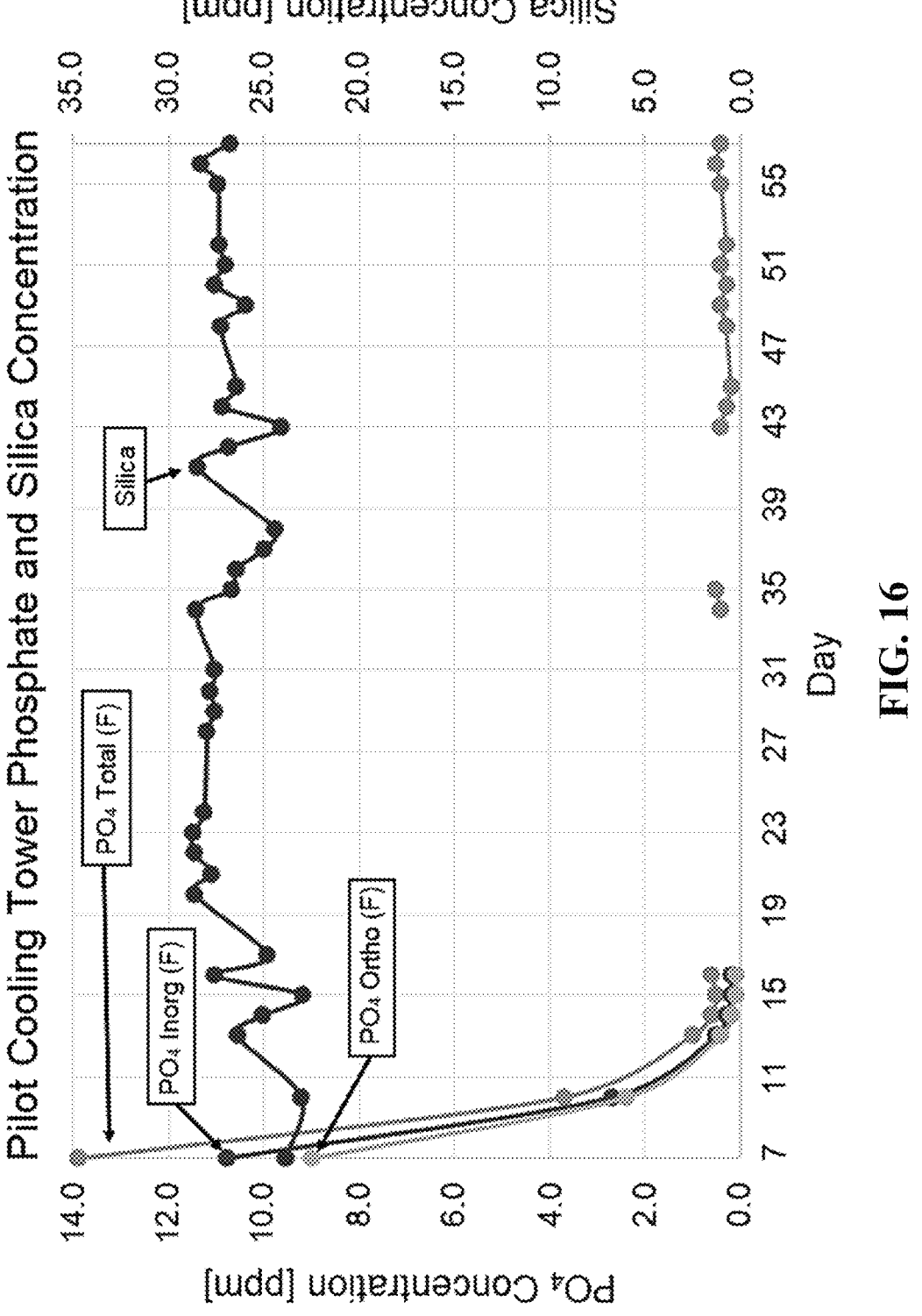

FIG. 16 depicts a time plot showing the total phosphate concentration (filtered (F) prior to measurement), inorganic phosphate concentration (filtered (F) prior to measurement), orthophosphate concentration (filtered (F) prior to measurement), and silica concentration of the phosphate-based treatment program used in combination with a metal-containing treatment program.

Figure 17:
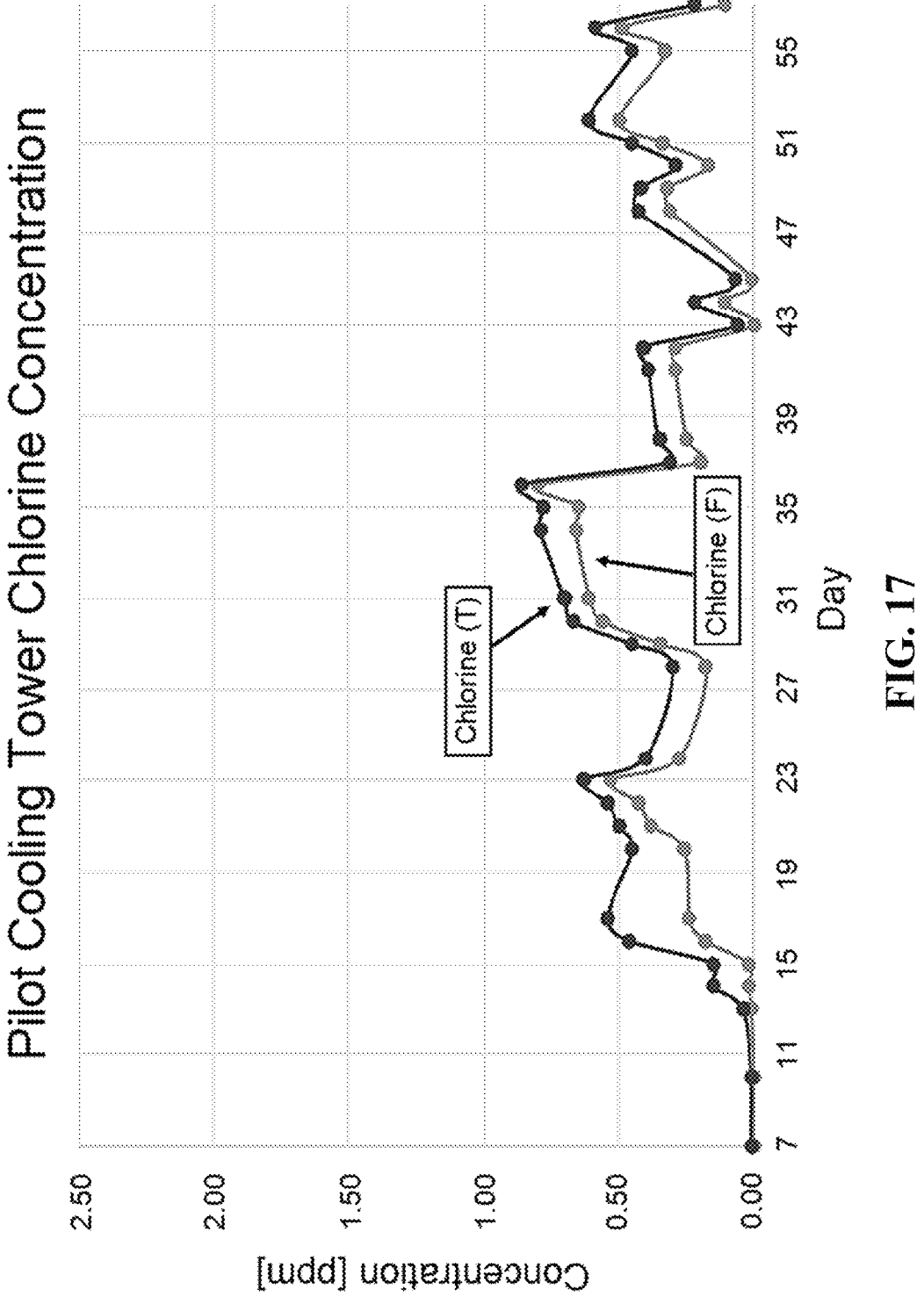

FIG. 17 depicts a time plot showing the free chlorine concentration (F) and total chlorine concentration (T) of the phosphate-based treatment program used in combination with a metal-containing treatment program.

Figure 18:
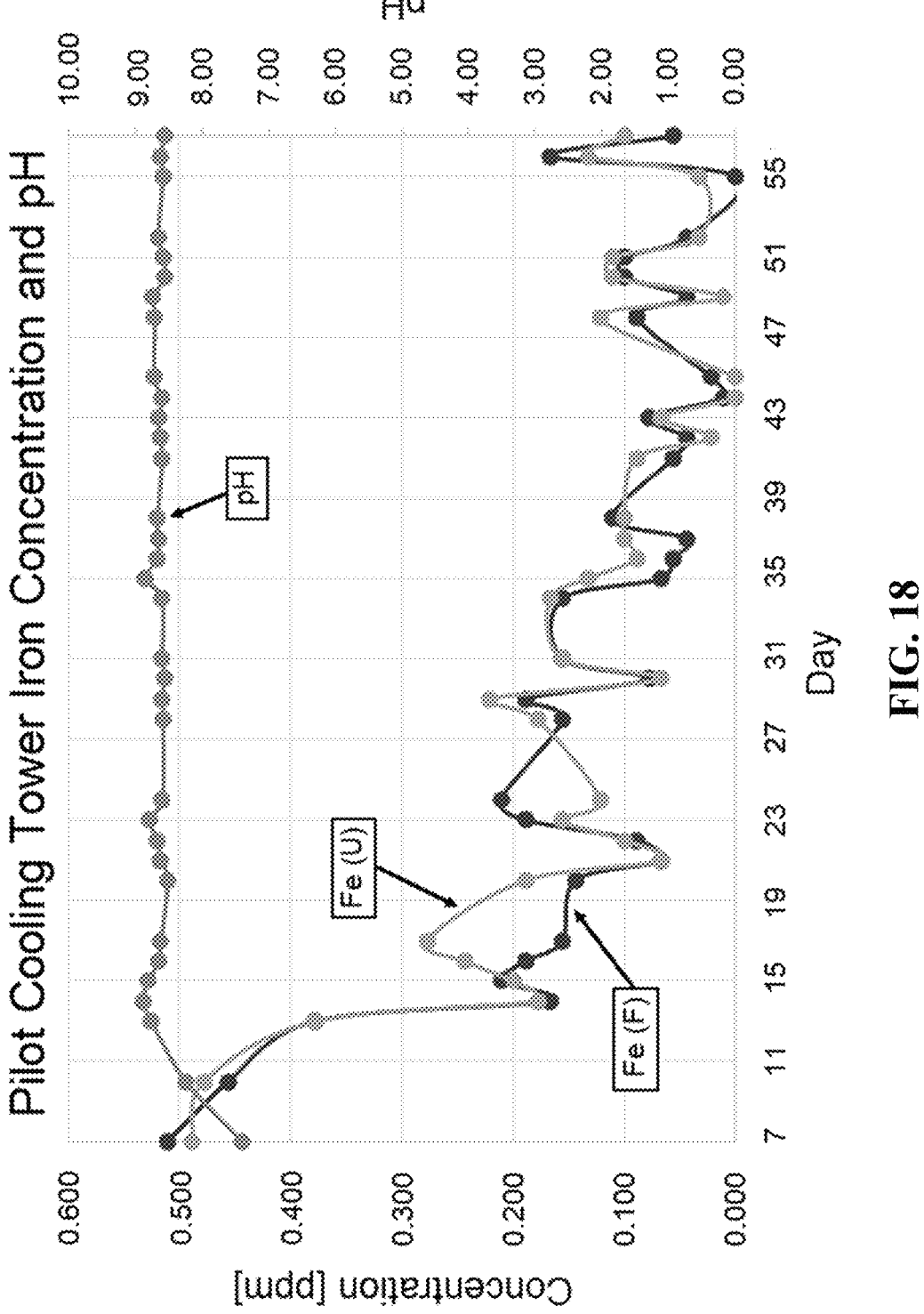

FIG. 18 depicts a time plot showing the iron concentration (filtered (F) prior to measurement and unfiltered (U)) and pH of the phosphate-based treatment program used in combination with a metal-containing treatment program.

Figure 19:
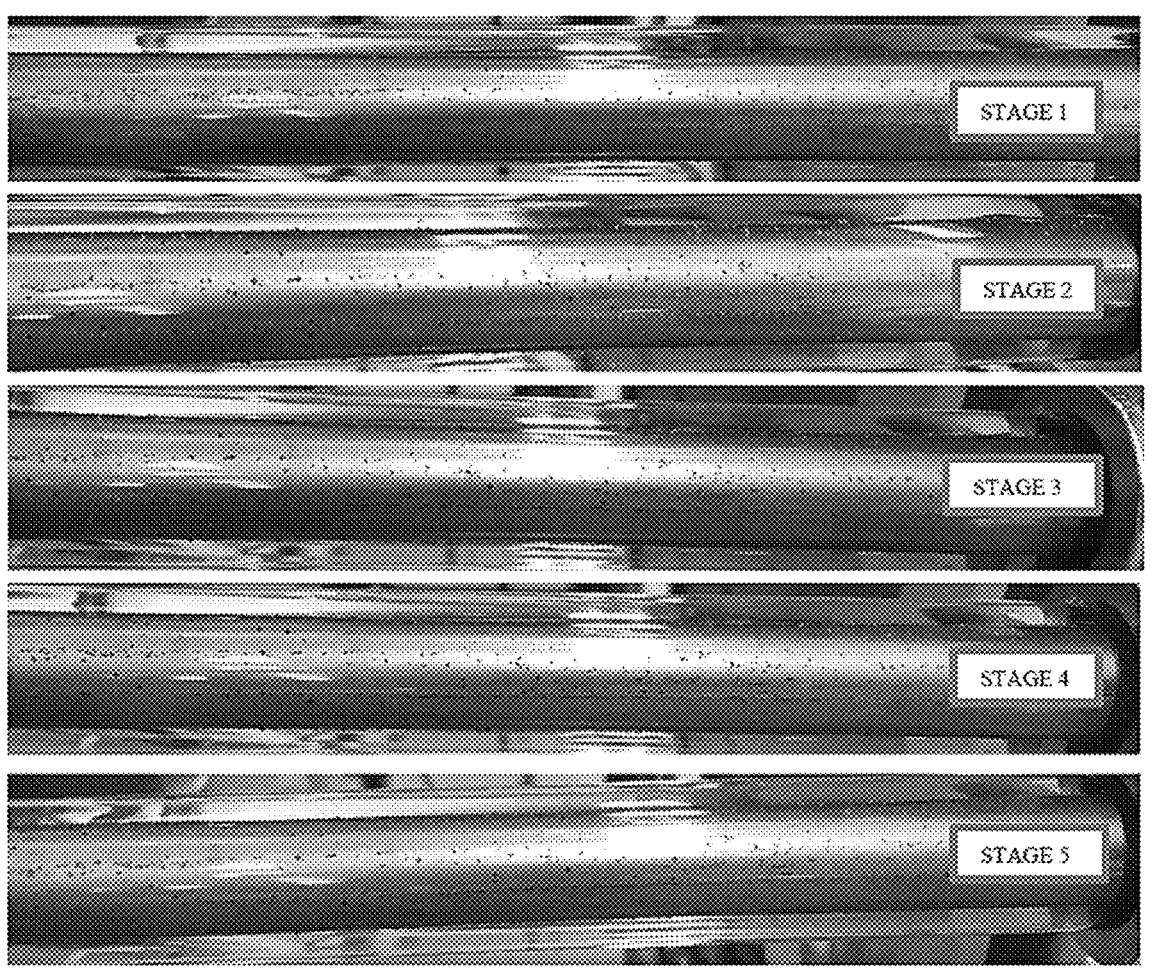

FIG. 19 shows the mild steel tubes of the pilot cooling tower for the phosphate-based treatment program used in combination with a metal-containing treatment program.

Figure 20:
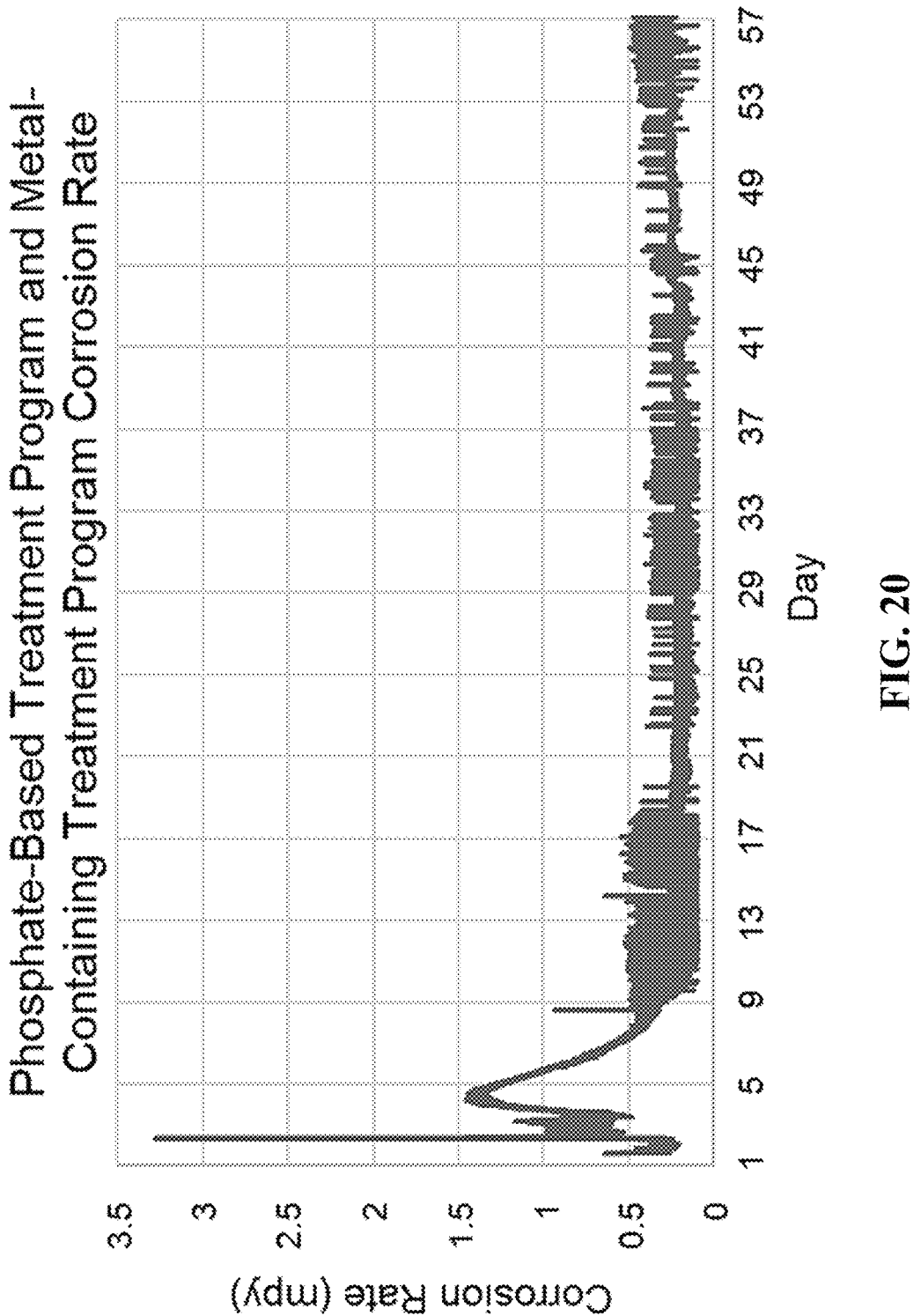

FIG. 20 depicts a time plot showing the corrosion rate (mpy), measured using linear polarization resistance (LPR) electrochemical analysis, of the phosphate-based treatment program used in combination with a metal-containing treatment program.

DETAILED DESCRIPTION OF THE INVENTION

The invention provides a method of inhibiting corrosion of a metal in an industrial water system, the method comprising: (i) treating water of the industrial water system with a corrosion inhibiting-effective amount of a phosphorus-based treatment program comprising a phosphorus-based compound to provide a first treated industrial water, and (ii) treating the first treated industrial water with a corrosion inhibiting-effective amount of a metal-containing treatment program to provide a second treated industrial water, to inhibit corrosion of metal in the system.

Any suitable phosphorus-based compound may be used to provide a first treated industrial water in accordance with the invention. As used herein, the phrase "phosphorus-based treatment program" may refer to any water treatment regimen (i.e., use of a water treatment formulation or series of water treatment formulations) comprising a phosphorus-based compound.

The phosphorus-based compound may include, e.g., any suitable compound comprising a phosphorus atom. For example, the phosphorous-based compound may be selected from an orthophosphate, a condensed phosphate, salts thereof, and a combination thereof. The phosphorous-based compound also may be selected from an organophosphonic acid, an organophosphinic acid, salts thereof, or a combination thereof. In some embodiments, the phosphorus-based compound may comprise a phosphate group ($PO_4$), a phosphonic group ($PO_3$), a phosphinic group ($PO_2$), or a combination thereof. For example, the phosphorus-based treatment program may include (i) an orthophosphate, a condensed phosphate, salts thereof, or a combination thereof and/or (ii) an organophosphonic acid, an organophosphinic acid, salts thereof, or a combination thereof. In other embodiments, the phosphorus-based treatment program includes pyrophosphate, hexametaphosphate, metaphosphate, polyphosphate, salts thereof, or a combination thereof. For example, the phosphorus-based treatment program may comprise aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PA- PEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphino succinic oligomer (PSO), salts thereof, or a combination thereof. In an exemplary embodiment, the phosphorus-based treatment program includes an orthophosphate, a pyrophosphate, a phosphino succinic oligomer (PSO), salts thereof, or a combination thereof.

As used herein, the phrase "corrosion inhibiting-effective amount of a phosphorus-based treatment program" may refer to any amount of the phosphorus-based treatment program to provide a first treated industrial water capable of reducing the corrosion rate in an industrial water system. For instance, the corrosion inhibiting-effective amount of the phosphorus-based treatment program may provide a concentration of about 0.1 ppm or more of phosphorus-based compound in the first treated industrial water, for example, about 0.5 ppm or more of phosphorus-based compound, about 1 ppm or more of phosphorus-based compound, about 5 ppm or more of phosphorus-based compound, about 10 ppm or more of phosphorus-based compound, about 15 ppm or more of phosphorus-based compound, about 20 ppm or more of phosphorus-based compound, or about 25 ppm or more of phosphorus-based compound. Alternatively, or additionally, the corrosion inhibiting-effective amount of the phosphorus-based treatment program may provide a concentration of about 500 ppm or less of phosphorus-based compound in the first treated industrial water, for example, about 250 ppm or less of phosphorus-based compound, about 100 ppm or less of phosphorus-based compound, about 75 ppm or less of phosphorus-based compound, about 50 ppm or less of phosphorus-based compound, about 40 ppm or less of phosphorus-based compound, or about 25 ppm or less of phosphorus-based compound.

The corrosion inhibiting-effective amount of the phosphorus-based treatment program also may include a concentration range of from about 0.1 ppm to about 500 ppm of phosphorus-based compound in the first treated industrial water, from about 0.5 ppm to about 500 ppm of phosphorus-based compound, from about 1 ppm to about 500 ppm of phosphorus-based compound, from about 5 ppm to about 500 ppm of phosphorus-based compound, from about 10 ppm to about 500 ppm of phosphorus-based compound, from about 15 ppm to about 500 ppm of phosphorus-based compound, from about 20 ppm to about 500 ppm of phosphorus-based compound, from about 25 ppm to about 500 ppm of phosphorus-based compound, from about 0.1 ppm to about 250 ppm of phosphorus-based compound, from about 0.5 ppm to about 250 ppm of phosphorus-based compound, from about 1 ppm to about 250 ppm of phosphorus-based compound, from about 5 ppm to about 250 ppm of phosphorus-based compound, from about 10 ppm to about 250 ppm of phosphorus-based compound, from about 15 ppm to about 250 ppm of phosphorus-based compound, from about 20 ppm to about 250 ppm of phosphorus-based compound, from about 25 ppm to about 250 ppm of phosphorus-based compound, from about 0.1 ppm to about 100 ppm of phosphorus-based compound, from about 0.5 ppm to about 100 ppm of phosphorus-based compound, from about 1 ppm to about 100 ppm of phosphorus-based compound, from about 5 ppm to about 100 ppm of phosphorus-based compound, from about 10 ppm to about 100 ppm of phosphorus-based compound, from about 15 ppm to about 100 ppm of phosphorus-based compound, from about 20 ppm to about 100 ppm of phosphorus-based compound, from about 25 ppm to about 100 ppm of phosphorus-based compound, from about 0.1 ppm to about 75 ppm of phosphorus-based compound, from about 0.5 ppm to about 75 ppm of phosphorus-based compound, from about 1 ppm to about 75 ppm of phosphorus-based compound, from about 5 ppm to about 75 ppm of phosphorus-based compound, from about 10 ppm to about 75 ppm of phosphorus-based compound, from about 15 ppm to about 75 ppm of phosphorus-based compound, from about 20 ppm to about 75 ppm of phosphorus-based compound, from about 25 ppm to about 75 ppm of phosphorus-based compound, from about 0.1 ppm to about 50 ppm of phosphorus-based compound, from about 0.5 ppm to about 50 ppm of phosphorus-based compound, from about 1 ppm to about 50 ppm of phosphorus-based compound, from about 5 ppm to about 50 ppm of phosphorus-based compound, from about 10 ppm to about 50 ppm of phosphorus-based compound, from about 15 ppm to about 50 ppm of phosphorus-based compound, from about 20 ppm to about 50 ppm of phosphorus-based compound, from about 25 ppm to about 50 ppm of phosphorus-based compound, from about 0.1 ppm to about 40 ppm of phosphorus-based compound, from about 0.5 ppm to about 40 ppm of phosphorus-based compound, from about 1 ppm to about 40 ppm of phosphorus-based compound, from about 5 ppm to about 40 ppm of phosphorus-based compound, from about 10 ppm to about 40 ppm of phosphorus-based compound, from about 15 ppm to about 40 ppm of phosphorus-based compound, from about 20 ppm to about 40 ppm of phosphorus-based compound, from about 25 ppm to about 40 ppm of phosphorus-based compound, from about 0.1 ppm to about 25 ppm of phosphorus-based compound, from about 0.5 ppm to about 25 ppm of phosphorus-based compound, from about 1 ppm to about 25 ppm of phosphorus-based compound, from about 5 ppm to about 25 ppm of phosphorus-based compound, from about 10 ppm to about 25 ppm of phosphorus-based compound, or from about 15 ppm to about 25 ppm of phosphorus-based compound. In some embodiments, the corrosion inhibiting-effective amount of the phosphorus-based treatment program provides a concentration of from about 1 ppm to about 100 ppm of phosphorus-based compound in the first treated industrial water. For example, the corrosion inhibiting-effective amount of the phosphorus-based treatment program may provide a concentration from about 5 ppm to about 40 ppm of phosphorus-based compound in the first treated industrial water.

The first treated industrial water (i.e., first treated water of the industrial water system) may be treated with a corrosion inhibiting-effective amount of any suitable metal-containing treatment program to provide a second treated industrial water, to inhibit corrosion of metal in the system (i.e., metal that comes into contact with the industrial water system). As used herein, the phrase "metal-containing treatment program" may refer to any water treatment regimen (i.e., use of a water treatment formulation or series of water treatment formulations) comprising a metal-based corrosion inhibitor described herein.

The metal-based corrosion inhibitor may include any suitable metal-based compound comprising a metal atom. For example, the metal-based corrosion inhibitor may include lanthanum, cerium, yttrium, scandium, aluminum, tin, or a combination thereof. In some embodiments, the metal-based corrosion inhibitor comprises a rare earth metal. For example, the metal-based corrosion inhibitor may include any suitable rare earth metal or combination of rare earth metals such as, for example, cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). In certain embodiments, the rare earth metal is lanthanum (La), cerium (Ce), yttrium (Y), or a combination thereof. In some embodiments, the metal-containing treatment program comprises a metal-based corrosion inhibitor comprising a metal atom having a phosphate salt water solubility of $1 \times 10^{-7}$ g/L or less, for example, a phosphate salt water solubility of $1 \times 10^{-8}$ g/L or less, a phosphate salt water solubility of $1 \times 10^{-9}$ g/L or less, or a phosphate salt water solubility of $1 \times 10^{-10}$ g/L or less. In other words, the metal [M] when in the form $[M]_x[PO_4]_y$ has a water solubility of $1 \times 10^{-7}$ g/L or less, for example, a water solubility of $1 \times 10^{-8}$ g/L or less, a water solubility of $1 \times 10^{-9}$ g/L or less, or a water solubility of $1 \times 10^{-10}$ g/L or less, where variables x and y are modified to maintain charge balance. For example, the pKsp for yttrium phosphate is 24.76, which corresponds to a water solubility of approximately $7.66 \times 10^{-11}$ g/L. Lanthanum phosphate and ytterbium phosphate are even more insoluble than yttrium phosphate. See, for example, Firsching et al. (J. Chem. Eng. Data, 36: 93-95 (1991)). In addition, cerium phosphate has a Ksp of $5.01 \times 10^{-27}$, which corresponds to a water solubility of approximately $1.66 \times 10^{-11}$ g/L, lanthanum phosphate has a Ksp of $7.08 \times 10^{-27}$, which corresponds to a water solubility of approximately $1.967 \times 10^{-11}$ g/L, and aluminum phosphate has a Ksp of $9.84 \times 10^{-21}$, which corresponds to a water solubility of approximately $1.2 \times 10^{-8}$ g/L. In certain embodiments, the metal atom has a phosphate salt water solubility of $1 \times 10^{-8}$ g/L or less. In preferred embodiments, the metal atom has a phosphate salt water solubility of $1 \times 10^{-10}$ g/L or less.

Without wishing to be bound by any particular theory, it is believed that a metal atom in the metal-based corrosion inhibitor can strongly bind with the phosphorus-based compound (e.g., phosphates) with sufficient affinity or strength to form a sparingly water soluble compound or complex. In other words, without wishing to be bound by any particular theory, it is believed that the metal-based corrosion inhibitor has a binding energy with phosphorus (e.g., phosphates) and of sufficient affinity or strength to adsorb to the phosphorus-based compound (e.g., phosphates), such that the resulting compound or complex effectively forms a protective layer on a metal surface of the industrial water system during the phosphorus-based treatment program. To the extent that the resulting compound/complex is sparingly water soluble, the poor water solubility should minimize possible dissolution of the phosphorus-based compound (e.g., phosphates) from such a protective layer on the metal surface of the industrial water system, thereby enhancing protection from corrosion.

The metal-based corrosion inhibitor used in the metal-containing treatment program may be present or added to the first treated industrial water (i.e., first treated water of the industrial water system) in any suitable form. For example, one or more inhibitors that include one or more rare earth metal(s) may be present or added to the first treated industrial water as a salt, a metal in an organic framework or complex, an organometallic reagent, a Lewis acid, a neutral metal, a hydrate, an ion, or as any combination of such forms. For example, lanthanum may be present or added to the first treated industrial water (i.e., first treated water of the industrial water system) as $LaCl_3 7H_2O$, cerium may be present or added to the first treated industrial water (i.e., water of the industrial water system) as $CeCl_3 7H_2O$, and yttrium may be present or added to the first treated industrial water as $YCl_3 6H_2O$.

As used herein, the phrase "corrosion inhibiting-effective amount of a metal-containing treatment program" refers to any amount of the metal-containing treatment program sufficient to provide a second treated industrial water capable of reducing the corrosion rate in an industrial water system. For instance, the corrosion inhibiting-effective amount of the metal-containing treatment program may provide a concentration of about 0.1 ppm or more of metal-based corrosion inhibitor in the second treated industrial water, for example, about 0.5 ppm or more of metal-based corrosion inhibitor, about 1 ppm or more of metal-based corrosion inhibitor, or about 5 ppm or more of metal-based corrosion inhibitor. Alternatively, or additionally, the corrosion inhibiting-effective amount of the metal-containing treatment program may provide a concentration of about 500 ppm or less of metal-based corrosion inhibitor in the second treated industrial water, for example, about 250 ppm or less of metal-based corrosion inhibitor, about 100 ppm or less of metal-based corrosion inhibitor, about 50 ppm or less of metal-based corrosion inhibitor, about 25 ppm or less of metal-based corrosion inhibitor, or about 10 ppm or less of metal-based corrosion inhibitor.

The corrosion inhibiting-effective amount of the metal-containing treatment program also may provide a concentration range of from about 0.1 ppm to about 500 ppm of metal-based corrosion inhibitor in the second treated industrial water, from about 0.5 ppm to about 500 ppm of metal-based corrosion inhibitor, from about 1 ppm to about 500 ppm of metal-based corrosion inhibitor, from about 5 ppm to about 500 ppm of metal-based corrosion inhibitor, from about 0.1 ppm to about 250 ppm of metal-based corrosion inhibitor, from about 0.5 ppm to about 250 ppm of metal-based corrosion inhibitor, from about 1 ppm to about 250 ppm of metal-based corrosion inhibitor, from about 5 ppm to about 250 ppm of metal-based corrosion inhibitor, from about 0.1 ppm to about 100 ppm of metal-based corrosion inhibitor, from about 0.5 ppm to about 100 ppm of metal-based corrosion inhibitor, from about 1 ppm to about 100 ppm of metal-based corrosion inhibitor, from about 5 ppm to about 100 ppm of metal-based corrosion inhibitor, from about 0.1 ppm to about 50 ppm of metal-based corrosion inhibitor, from about 0.5 ppm to about 50 ppm of metal-based corrosion inhibitor, from about 1 ppm to about 50 ppm of metal-based corrosion inhibitor, from about 5 ppm to about 50 ppm of metal-based corrosion inhibitor, from about 0.1 ppm to about 25 ppm of metal-based corrosion inhibitor, from about 0.5 ppm to about 25 ppm of metal-based corrosion inhibitor, from about 1 ppm to about 25 ppm of metal-based corrosion inhibitor, or from about 5 ppm to about 25 ppm of metal-based corrosion inhibitor. In some embodiments, the corrosion inhibiting-effective amount of the metal-containing treatment program provides a concentration of from about 0.1 ppm to about 100 ppm of metal-based corrosion inhibitor in the second treated industrial water. For example, the corrosion inhibiting-effective amount of the metal-containing treatment program may provide a concentration of from about 1 ppm to about 25 ppm of metal-based corrosion inhibitor in the second treated industrial water.

In some embodiments, the phosphorus-based treatment program and/or the metal-containing treatment program further includes at least one polycarboxylic acid. The polycarboxylic acid(s) used in the phosphorus-based treatment program and/or the metal-containing treatment program may include two or more carboxylic acids. For example, the polycarboxylic acid may include two carboxylic acids, three carboxylic acids, four carboxylic acids, five carboxylic acids, six carboxylic acids, or more. In some embodiments, the polycarboxylic acid includes a hydroxy polycarboxylic acid. For example, the phosphorus-based treatment program and/or the metal-containing treatment program may include at least one polycarboxylic acid, which includes, e.g., two or more carboxylic acids and one or more hydroxyl groups. Thus, the polycarboxylic acid may include no hydroxyl substituents, one hydroxyl substituent, two hydroxyl substituents, three hydroxyl substituents, four hydroxyl substituents, five hydroxyl substituents, six hydroxyl substituents, or more than six hydroxyl substituents. In some embodiments, the polycarboxylic acid includes at least two (i.e., two or more) carboxylic acids and at least two (i.e., two or more) hydroxyl moieties.

Exemplary polycarboxylic acids include, but are not limited to, tartaric acid, citric acid, malic acid, ascorbic acid, glucaric acid, coumaric acid, propionic acid, oxobutyric acid, 2,3-pyridinedicaroboxylic acid, 4,5-imidazoledicarboxylic acid, 1,2,3,4-butanetetracarboxylic acid (BTCA), polyepoxysuccinic acid (PESA), a salt thereof, or a combination of such polycarboxylic acid(s) and/or salt(s) thereof. In some embodiments, the phosphorus-based treatment program and/or the metal-containing treatment program includes tartaric acid or a salt thereof.

The phosphorus-based treatment program and/or the metal-containing treatment program may be formulated and/or implemented so as to provide any suitable amount of the polycarboxylic acid in the first treated industrial water and/or in the second treated industrial water. For instance, the phosphorus-based treatment program and/or the metal-containing treatment program may provide a concentration of about 0.1 ppm or more of polycarboxylic acid in the first treated industrial water and/or in the second treated industrial water, for example, about 0.5 ppm or more of polycarboxylic acid, about 1 ppm or more of polycarboxylic acid, or about 5 ppm or more of polycarboxylic acid. Alternatively, or additionally, the phosphorus-based treatment program and/or the metal-containing treatment program may provide a concentration of about 500 ppm or less of polycarboxylic acid in the first treated industrial water and/or in the second treated industrial water, for example, about 250 ppm or less of polycarboxylic acid, about 200 ppm or less of polycarboxylic acid, about 100 ppm or less of polycarboxylic acid, or about 50 ppm or less of polycarboxylic acid, in the first treated industrial water and/or in the second treated industrial water.

For example, the phosphorus-based treatment program and/or the metal-containing treatment program may be formulated and/or implemented so as to provide a concentration of from about 0.1 ppm to about 500 ppm of polycarboxylic acid in the first treated industrial water and/or in the second treated industrial water, from about 0.5 ppm to about 500 ppm of polycarboxylic acid, from about 1 ppm to about 500 ppm of polycarboxylic acid, from about 5 ppm to about 500 ppm of polycarboxylic acid, from about 0.1 ppm to about 250 ppm of polycarboxylic acid, from about 0.5 ppm to about 250 ppm of polycarboxylic acid, from about 1 ppm to about 250 ppm of polycarboxylic acid, from about 5 ppm to about 250 ppm of polycarboxylic acid, from about 0.1 ppm to about 200 ppm of polycarboxylic acid, from about 0.5 ppm to about 200 ppm of polycarboxylic acid, from about 1 ppm to about 200 ppm of polycarboxylic acid, from about 5 ppm to about 200 ppm of polycarboxylic acid, from about 0.1 ppm to about 100 ppm of polycarboxylic acid, from about 0.5 ppm to about 100 ppm of polycarboxylic acid, from about 1 ppm to about 100 ppm of polycarboxylic acid, from about 5 ppm to about 100 ppm of polycarboxylic acid, from about 0.1 ppm to about 50 ppm of polycarboxylic acid, from about 0.5 ppm to about 50 ppm of polycarboxylic acid, from about 1 ppm to about 50 ppm of polycarboxylic acid, or from about 5 ppm to about 50 ppm of polycarboxylic acid, in the first treated industrial water and/or in the second treated industrial water. In some embodiments, the phosphorus-based treatment program and/or the metal-containing treatment program provides a concentration of from about 1 ppm to about 200 ppm of polycarboxylic acid in the first treated industrial water and/or in the second treated industrial water. In certain embodiments, the phosphorus-based treatment program and/or the metal-containing treatment program provides a concentration of from about 5 ppm to about 100 ppm of polycarboxylic acid in the first treated industrial water and/or in the second treated industrial water.

In some embodiments, the phosphorus-based treatment program and/or the metal-containing treatment program further includes a polymer dispersant comprising at least one sulfonic group. Any suitable polymer dispersant comprising at least one sulfonic group may be used in the phosphorus-based treatment program and/or the metal-containing treatment program of the invention. As used herein, "sulfonic group" refers to any oxidized sulfur containing moiety. In some embodiments, the sulfonic group is of the formula —S(=O)$_2$—OH or a salt thereof. The sulfonic group can be incorporated into the polymer dispersant as a monomeric component or can be added or grafted to the polymer, e.g., post-polymerization, as a chemical modification. In some embodiments, the sulfonic group may be incorporated into the polymer dispersant by chemically incorporating at least one monomeric component selected from acrylamidomethanesulfonic acid, (dimethyl(2-oxobut-3-en-1-yl)ammonio) methanesulfonate, allyloxypolethoxy(10) sulfonic acid, 2-acrylamido-2-methylpropane sulfonic acid, 2-acrylamido-2-methylbutane sulfonic acid, acrylamide tertbutylsulfonate, 4-(allyloxy)benzenesulfonic acid, styrene sulfonic acid, allyl sulfonic acid, methallyl sulfonic acid, allyl hydroxypropane sulfonic acid, salts thereof, and combinations thereof.

The polymer dispersant comprising at least one sulfonic group may further include any suitable additional monomeric component without a sulfonic group. For example, the polymer dispersant may further include at least one monomeric component selected from (meth)acrylamide, (meth) acrylic acid, itaconic acid, maleic anhydride, crotonic acid, acrylamido glycolic acid, salicylic acrylamido glycolic acid, allylmalonic acid dimethyl ester, 2-carboxyethyl acrylate, 3-acrylamido-3-methylbutanoic acid, salts thereof, and combinations thereof.

The polymer dispersant comprising at least one sulfonic group may have any suitable weight average molecular weight. For instance, the polymer dispersant comprising at least one sulfonic group may have a weight average molecular weight of about 500 g/mol or more, for example, about 750 g/mol or more, about 1,000 g/mol or more, about 1,500 g/mol or more, about 2,000 g/mol or more, about 2,500 g/mol or more, about 3,000 g/mol or more, about 3,500 g/mol or more, about 4,000 g/mol or more, about 4,500 g/mol or more, about 5,000 g/mol or more, about 5,500 g/mol or more, about 6,000 g/mol or more, about 6,500 g/mol or more, about 7,000 g/mol or more, or about 7,500 g/mol or more. Alternatively, or additionally, the polymer dispersant comprising at least one sulfonic group may have a weight average molecular weight of about 20,000 g/mol or less, for example, about 15,000 g/mol or less, about 10,000 g/mol or less, for example, about 9,000 g/mol or less, about 8,000 g/mol or less, about 7.500 g/mol or less, about 7,000 g/mol or less, about 6,500 g/mol or less, about 6,000 g/mol or less, about 5,500 g/mol or less, about 5.000 g/mol or less, about 4,500 g/mol or less, about 4.000 g/mol or less, about 3,500 g/mol or less, about 3,000 g/mol or less, about 2,500 g/mol or less, or about 2,000 g/mol or less. Thus, the polymer dispersant comprising at least one sulfonic group may have a weight average molecular weight bounded by any two of the aforementioned endpoints. The polymer dispersant comprising at least one sulfonic group may have a weight average molecular weight range of about 500 g/mol to about 20,000 g/mol, e.g., about 500 g/mol to about 15,000 g/mol, about 500 g/mol to about 10,000 g/mol, about 500 g/mol to about 5,000 g/mol, about 1,000 g/mol to about 20,000 g/mol, about 1,000 g/mol to about 15,000 g/mol, about 1,000 g/mol to about 10,000 g/mol, about 1,000 g/mol to about 5,000 g/mol, or about 2,000 g/mol to about 20,000 g/mol.

The phosphorus-based treatment program and/or the metal-containing treatment program may be formulated and/or implemented so as to provide any suitable amount of polymer dispersant in the first treated industrial water and/or in the second treated industrial water. For instance, the phosphorus-based treatment program and/or the metal-containing treatment program may provide a concentration of about 0.1 ppm or more of polymer dispersant in the first treated industrial water and/or in the second treated industrial water, for example, about 0.5 ppm or more of polymer dispersant, about 1 ppm or more of polymer dispersant, about 2 ppm or more of polymer dispersant, or about 5 ppm or more of polymer dispersant, in the first treated industrial water and/or in the second treated industrial water. Alternatively, or additionally, the phosphorus-based treatment program and/or the metal-containing treatment program may provide a concentration of about 500 ppm or less of polymer dispersant in the first treated industrial water and/or in the second treated industrial water, for example, about 250 ppm or less of polymer dispersant, about 200 ppm or less of polymer dispersant, about 100 ppm or less of polymer dispersant, about 50 ppm or less of polymer dispersant, or about 20 ppm or less of polymer dispersant, in the first treated industrial water and/or in the second treated industrial water.

For example, the phosphorus-based treatment program and/or the metal-containing treatment program may provide a concentration of from about 0.1 ppm to about 500 ppm of polymer dispersant in the first treated industrial water and/or in the second treated industrial water, from about 0.5 ppm to about 500 ppm of polymer dispersant, from about 1 ppm to about 500 ppm of polymer dispersant, from about 2 ppm to about 500 ppm of polymer dispersant, from about 5 ppm to about 500 ppm of polymer dispersant, from about 0.1 ppm to about 250 ppm of polymer dispersant, from about 0.5 ppm to about 250 ppm of polymer dispersant, from about 1 ppm to about 250 ppm of polymer dispersant, from about 2 ppm to about 250 ppm of polymer dispersant, from about 5 ppm to about 250 ppm of polymer dispersant, from about 0.1 ppm to about 200 ppm of polymer dispersant, from about 0.5 ppm to about 200 ppm of polymer dispersant, from about 1 ppm to about 200 ppm of polymer dispersant, from about 2 ppm to about 200 ppm of polymer dispersant, from about 5 ppm to about 200 ppm of polymer dispersant, from about 0.1 ppm to about 100 ppm of polymer dispersant, from about 0.5 ppm to about 100 ppm of polymer dispersant, from about 1 ppm to about 100 ppm of polymer dispersant, from about 2 ppm to about 100 ppm of polymer dispersant, from about 5 ppm to about 100 ppm of polymer dispersant, from about 0.1 ppm to about 50 ppm of polymer dispersant, from about 0.5 ppm to about 50 ppm of polymer dispersant, from about 1 ppm to about 50 ppm of polymer dispersant, from about 2 ppm to about 50 ppm of polymer dispersant, from about 5 ppm to about 50 ppm of polymer dispersant, from about 0.1 ppm to about 20 ppm of polymer dispersant, from about 0.5 ppm to about 20 ppm of polymer dispersant, from about 1 ppm to about 20 ppm of polymer dispersant, from about 2 ppm to about 20 ppm of polymer dispersant, or from about 5 ppm to about 20 ppm of polymer dispersant, in the first treated industrial water and/or in the second treated industrial water. In some embodiments, the phosphorus-based treatment program and/or the metal-containing treatment program provides a concentration of from about 1 ppm to about 50 ppm of polymer dispersant in the first treated industrial water and/or in the second treated industrial water. For example, the phosphorus-based treatment program and/or the metal-containing treatment program may provide a concentration of from about 2 ppm to about 20 ppm of polymer dispersant in the first treated industrial water and/or in the second treated industrial water.

In some embodiments, the phosphorus-based treatment program and/or the metal-containing treatment program further includes silica or a silicate. As used herein, "silica" refers to any mineral or synthetic product that contains silicon and oxygen atoms, and which is known in the art as a silica compound, e.g., compounds that may be empirically described by the formula $SiO_2$, or a hydrate thereof, and "silicate" refers to any salt of such a silica compound with an anionic component. For example, the silicate may include any salt comprising $SiO_4^{2-}$ as the anion, e.g., sodium silicate. In some embodiments, the water treatment composition further comprises silica (e.g., $SiO_2$) or a hydrate thereof.

The phosphorus-based treatment program and/or the metal-containing treatment program of the invention may be formulated and/or implemented so as to provide a concentration of from about 0 ppm to about 10,000 ppm of a silica or silicate in the first treated industrial water and/or in the second treated industrial water, e.g., from about 1 ppm to about 10,000 ppm, from about 1 ppm to about 5,000 ppm, from about 1 ppm to about 1,000 ppm, from about 1 ppm to about 500 ppm, or from about 1 ppm to about 100 ppm, of a silica or silicate in the first treated industrial water and/or in the second treated industrial water. In some embodiments, the phosphorus-based treatment program and/or the metal-containing treatment program provides a concentration of from about 1 ppm to about 100 ppm of a silica or silicate in the first treated industrial water and/or in the second treated industrial water.

The phosphorus-based treatment program and/or the metal-containing treatment program may further include a scale inhibitor. The scale inhibitor may include any suitable scale inhibitor, including those which are known in the art. For example, the phosphorus-based treatment program may further include a scale inhibitor selected from polymaleic acid, poly(methyl)acrylic acid, polyepoxy succinic acid (PESA), polyaspartic acid (PASP), salts thereof, and combinations thereof. Alternatively, or additionally, the metal-containing treatment program may further include a scale inhibitor selected from polymaleic acid, poly(methyl)acrylic acid, polyepoxy succinic acid (PESA), polyaspartic acid (PASP), aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PAPEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphino succinic oligomer (PSO), salts thereof, and combinations thereof. In certain embodiments, the phosphorus-based treatment program and/or the metal-containing treatment program further includes a scale inhibitor which includes polymaleic acid.

The phosphorus-based treatment program and/or the metal-containing treatment program of the invention may be formulated and/or implemented so as to provide a concentration of from about 0 ppm to about 10,000 ppm of a scale inhibitor in the first treated industrial water and/or in the second treated industrial water, e.g., from about 1 ppm to about 10,000 ppm, from about 1 ppm to about 5,000 ppm, from about 1 ppm to about 1,000 ppm, from about 1 ppm to about 500 ppm, or from about 1 ppm to about 100 ppm, of scale inhibitor in the first treated industrial water and/or in the second treated industrial water. In some embodiments, the phosphorus-based treatment program and/or the metal-containing treatment program provides a concentration of from about 1 ppm to about 100 ppm of scale inhibitor in the first treated industrial water and/or in the second treated industrial water.

The phosphorus-based treatment program and/or the metal-containing treatment program may further include at least one azole-based corrosion inhibitor. As used herein, "azole-based corrosion inhibitor" refers to any chemical compound that includes an azole moiety and inhibits corrosion. The azole-based corrosion inhibitor may include any suitable azole-based corrosion inhibitor, including those which are known in the art. Examples of azole-based corrosion inhibitors include, but are not limited to, benzotriazole (BZT), tolyltriazole (TT), 5-methylbenzotriazole (5-MeBT), 4-methylbenzotriazole (4-MeBT), butylbenzotriazole (BBT), pentoxybenzotriazole (POBT), carboxylbenzotriazole (CBT), tetrahydrotolyltriazole (THT), a halogen resistant azole (HRA, e.g., chlorobenzotriazole or chlorotolyltriazole), salts thereof, and combinations thereof. Other suitable azole-based corrosion inhibitors are described in U.S. Patent Application Publication No. 2019/0203362 and U.S. Pat. Nos. 10,190,222, 10,202,694, 10,519,116, 10,669, 637, and 11,053,203. In some embodiments, the phosphorus-based treatment program and/or the metal-containing treatment does not contain an azole-based corrosion inhibitor, e.g., such that the method includes a metal-containing treatment program with an azole-based corrosion inhibitor, and a phosphorus-based treatment program without an azole-based corrosion inhibitor.

The phosphorus-based treatment program and/or the metal-containing treatment program of the invention may be formulated and/or implemented to provide a concentration of from about 0 ppm to about 10,000 ppm of the azole-based corrosion inhibitor in the first treated industrial water and/or in the second treated industrial water, e.g., from about 1 ppm to about 10,000 ppm, from about 1 ppm to about 5,000 ppm, from about 1 ppm to about 1,000 ppm, from about 1 ppm to about 500 ppm, or from about 1 ppm to about 100 ppm, of azole-based corrosion inhibitor in the first treated industrial water and/or in the second treated industrial water. In some embodiments, the phosphorus-based treatment program and/or the metal-containing treatment program provides a concentration of from about 1 ppm to about 100 ppm of azole-based corrosion inhibitor in the first treated industrial water and/or in the second treated industrial water.

In some embodiments, the phosphorus-based treatment program and/or the metal-containing treatment program further includes a carrier. The carrier may include any suitable component that increases the miscibility or availability of the phosphorus-based treatment program and/or the metal-containing treatment program in the first treated industrial water and/or in the second treated industrial water. For example, the carrier may simply include water and/or may include a water-miscible co-solvent such as, for example, acetone, methanol, ethanol, propanol, formic acid, formamide, propylene glycol, ethylene glycol, or combinations thereof.

The methods of the invention are useful for inhibiting the corrosion of a metal surface that may come into contact with water used in an industrial water system. In certain embodiments, the method may include contacting a metal surface directly with one or more components of the phosphorus-based treatment program and/or the metal-containing treatment program, e.g., by immersion, spraying, or other coating techniques. In other embodiments, the components of the phosphorus-based treatment program and/or the metal-containing treatment program may be introduced into the water of the industrial water system by any conventional method and, if desired, may be fed into the industrial water system on either a periodic or continuous basis, to inhibit corrosion of metal in the system.

The phosphorus-based treatment program and a metal-containing treatment program described herein each may refer to a formulation used to treat an industrial water system (i.e., a composition to be added to the industrial water system to treat the water used in the system) or a combination of formulations used to treat an industrial water system (i.e., a series of compositions to be added to the industrial water system to treat the water used in the system) which provides the desired characteristics (e.g., components and compositions) of the phosphorus-based treatment program and/or metal-containing treatment program.

In some embodiments, the components of the phosphorus-based treatment program and the metal-containing treatment program (e.g., the formulation or formulations containing the components), which are to be used to treat an industrial water system, each may be supplied, for example, as a one-package system comprising the phosphorus-based treatment program and the metal-containing treatment program, and any further optional components. Alternatively, the components of the phosphorus-based treatment program and the metal-containing treatment program (i.e., the formulation or formulations containing the components) each may be supplied as a two-package system, three-package system, four-package system, five-package system, six-package system, or as a multi-component system with more than six packages, comprising the phosphorus-based treatment program, the metal-containing treatment program, and/or any further optional components as individual additives. In some embodiments, a multi-component system may allow for the adjustment of relative amounts of the components of the phosphorus-based treatment program and/or the metal-containing treatment program, and any further optional components, by allowing the user to adjust the blending ratio of the components. Various methods can be employed to utilize such a multi-package system. For example, the components can be pre-mixed at the point-of use, or the components can be delivered to the industrial water system individually or together using the same mechanism of addition, or by using different mechanisms of addition. The components may be delivered sequentially or at the same time. As used herein, "point-of-use" refers to the point at which the phosphorus-based treatment program and the metal-containing treatment program are introduced to the industrial water system.

The components of the phosphorus-based treatment program and/or the metal-containing treatment program may be delivered to the point-of-use independently (such that the components are mixed together after being added to (or by) the industrial process), or one or more of the components can be combined/mixed together before delivery to the point-of-use, e.g., shortly or immediately before delivery to the point-of-use. Combining or mixing "immediately before delivery to the point-of-use" includes situations in which the components are combined about 5 minutes or less prior to being delivered in mixed form to the point-of-use, for example, about 4 minutes or less, about 3 minutes or less, about 2 minutes or less, about 1 minute or less, about 45 seconds or less, about 30 seconds or less, or about 10 seconds or less before being added in a mixed form, or simultaneously delivering the components such that they mix together while being delivered, at the point-of-use. Combining or mixing "immediately before the point-of-use" includes situations in which the components are combined within 5 m of the point-of-use, such as within 1 m of the point-of-use or even within 10 cm of the point-of-use (e.g., within 1 cm of the point-of-use).

The phosphorus-based treatment program and/or the metal-containing treatment program also may be provided as a concentrate which is intended to be diluted with an appropriate amount of water or other carrier prior to use, or diluted with the appropriate amount of water at the point-of-use (e.g., with the industrial water itself). In such an embodiment, the phosphorus-based treatment program and/or the metal-containing treatment program may be delivered as a concentrate, which may include the components of the formulation or formulations in amounts such that, upon dilution of the concentrate with an appropriate amount of water, each component of the phosphorus-based treatment program and/or the metal-containing treatment program will be present in the industrial water system in a concentration that is within the range needed for each component to serve its intended purpose. For example, any one of the components of the phosphorus-based treatment program and/or the metal-containing treatment program can each be present in the concentrate in an amount that is about 2 times (e.g., about 3 times, about 4 times, or about 5 times) greater than the range needed for each component to serve its intended purpose so that, when the concentrate is diluted with an equal volume of water (e.g., 2 equal volumes water, 3 equal volumes of water, or 4 equal volumes of water, respectively), each component will be present in the industrial water system in the concentration range needed for each component to serve its intended purpose.

The methods of the invention may include treating water of an industrial water system with the corrosion inhibiting-effective amount of the phosphorus-based treatment program for any suitable period of time. For example, the methods of the invention may include treating the water of an industrial water system for a period of from about one day to about one year, about one day to about six months, about one day to about 4 months, about one day to about three months, about one day to about two months, about one day to about one month, about one day to about two weeks, or about one day to about one week. In some embodiments, the method comprises treating the water of the industrial water system with the corrosion inhibiting-effective amount of the phosphorus-based treatment program for a period of from about one day to about three months. In certain embodiments, the method includes treating the water of an industrial water system with the corrosion inhibiting-effective amount of the phosphorus-based treatment program for a period of from about one day to about one month. For example, the method may include treating the water of an industrial water system with the corrosion inhibiting-effective amount of the phosphorus-based treatment program for a period of from about one day to about two weeks.

The methods of the invention also may include treating water of an industrial water system with the corrosion inhibiting-effective amount of the metal-containing treatment program for any suitable period of time. For example, the methods of the invention may include treating the water of an industrial water system for a period of from about one day to about one year, about one day to about six months, about one day to about 4 months, about one day to about three months, about one day to about two months, about one day to about one month, about one day to about two weeks, or about one day to about one week. In some embodiments, the method may include treating the water of an industrial water system with the corrosion inhibiting-effective amount of the metal-containing treatment program for a period of from about one day to about three months. For example, the method may include treating the water of an industrial water system with the corrosion inhibiting-effective amount of the metal-containing treatment program for a period of from about one day to about one month. As another example, the method may include treating the water of the industrial water system with the corrosion inhibiting-effective amount of the metal-containing treatment program for a period of from about one day to about two weeks.

The phosphorus-based treatment program may be administered prior to and/or concurrently with the metal-containing treatment program. In some embodiments, the methods of the invention may include terminating the phosphorus-based treatment program before (i.e., prior to) treating with the metal-containing treatment program. For example, the phosphorus-based treatment program may be terminated less than one month prior to treating with the metal-containing treatment program, less than one week prior to treating with the metal-containing treatment program, or less than one day prior to treating with the metal-containing treatment program. The phosphorus-based treatment program may be terminated abruptly (i.e., all at once) or by gradually reducing the corrosion inhibiting-effective amount of the phosphorus-based treatment program. Thus, in some embodiments, the phosphorus-based treatment program may be terminated in such a way as to avoid administering the phosphorus-based treatment program and the metal-containing treatment program concurrently.

The method also may include administering the phosphorus-based treatment program concurrently with the metal-containing treatment program. For example, the method may include treating water of an industrial water system with a corrosion inhibiting-effective amount of the phosphorus-based treatment program and a corrosion inhibiting-effective amount of the metal-containing treatment program at the same time. In some embodiments, the corrosion inhibiting-effective amount of the phosphorus-based treatment program may be, e.g., (i) gradually reduced prior to, (ii) gradually reduced during, and/or (iii) terminated during treatment with the metal-containing treatment program such that the phosphorus-based treatment program and the metal-containing treatment program are administered concurrently. In some embodiments, the phosphorus-based treatment program is discontinued (i.e., terminated or reduced to zero) at some point prior to or during treatment with the metal-containing treatment program.

The methods described herein also may include gradually reducing the corrosion inhibiting-effective amount of the metal-containing treatment program over the treatment period of the metal-containing treatment program. Without wishing to be bound by any particular theory, it is believed that administering the phosphorus-based treatment program prior to and/or concurrently with the metal-containing treatment program allows for the amount of both programs to be reduced (e.g., gradually reduced or terminated completely) without increasing the corrosion rate in the industrial water system, providing protection even after all programs of terminated.

As used herein, "industrial water system" means any system that circulates water as part of an industrial or industrially applicable process. Non-limiting examples of industrial water systems include, e.g., cooling systems, boiler systems, heating systems, membrane systems, paper making processes, or any other systems that move or circulate water as part of an industrial or industrially applicable process. In some embodiments, the industrial water system is a cooling water system such as, for example, an open loop cooling system, a closed loop cooling system, a passivation cooling system, or a combination thereof.

As used herein, "water" refers to any substance that includes water as a primary ingredient. Water may include, for example, purified water, tap water, fresh water, recycled water, brine, steam, and/or any aqueous solution, or aqueous blend.

As used herein, "metal" refers to any metal or metal alloy including, but not limited to, stainless steel, alloy steel, galvanized steel, tool steel, mild steel, aluminum, brass, bronze, iron, or copper. In some embodiments, the metal is copper. Copper has a wide-range of applications, including use as piping and tubing in plumbing and industrial machinery. Copper and copper alloys are well known for their use in cooling water and boiler water systems. In some embodiments, the metal is a copper alloy such as bronze and brass. Bronze commonly includes copper and tin, but may further include other elements such as, e.g., aluminum, manganese, silicon, arsenic, and phosphorus. Brass typically includes copper and zinc, and is commonly used in piping in water boiler systems. In some embodiments, the metal is mild steel. As used herein, "mild steel" refers to carbon and low alloy steels.

The water or treated water (e.g., the first treated industrial water and/or in the second treated industrial water) of the industrial water system may have any suitable pH. For example, the water or treated water (e.g., the first treated industrial water and/or in the second treated industrial water) of the industrial water system may have a pH of from about 6 to about 12. In some embodiments, the water or treated water (e.g., the first treated industrial water and/or in the second treated industrial water) has a pH of from about 6 to about 12, from about 6 to about 11, from about 6 to about 10, from about 6 to about 9, from about 6 to about 8, from about 7 to about 12, from about 8 to about 12, from about 9 to about 12, from about 7 to about 10, or from about 8 to about 10.

The methods of the invention may inhibit corrosion caused by any corrosive compound that an industrial water system may include, produce, or come into contact with. For example, the methods of the invention may inhibit corrosion in the presence of oxidizing halogen compounds including, but not limited to, hypochlorite bleach, chlorine, bromine, hypochlorite, hypobromite, chlorine dioxide, iodine/hypoiodous acid, hypobromous acid, halogenated hydantoins, stabilized versions of hypochlorous or hypobromous acids, or combinations thereof. Alternatively, or additionally, the methods of the invention may inhibit corrosion in the presence of non-halogen-containing oxidizing biocide including, but not limited to, peroxides (e.g., hydrogen peroxide), persulfates, permanganates, and peracetic acids.

The methods of the invention are intended to provide a metal (e.g., mild steel) corrosion rate that is regarded as acceptable according to industry standards, e.g., about 2 mpy or less. In some embodiments, the methods of the invention provide a metal (e.g., mild steel) corrosion rate of about 1 mpy or less, e.g., about 0.9 mpy or less, about 0.8 mpy or less, about 0.7 mpy or less, about 0.6 mpy or less, about 0.5 mpy or less, about 0.4 mpy, or about 0.3 mpy or less. In some embodiments, the methods of the invention provide a metal corrosion rate of about 0.1 mpy or less, about 0.05 mpy or less, about 0.04 mpy or less, about 0.03 mpy or less, about 0.02 mpy or less, about 0.01 mpy or less, about 0.005 mpy or less, or about 0.002 mpy or less.

EMBODIMENTS (1) In embodiment (1) is presented a method of inhibiting corrosion of a metal in an industrial water system, the method comprising: (i) treating water of the industrial water system with a corrosion inhibiting-effective amount of a phosphorus-based treatment program comprising a phosphorus-based compound to provide a first treated industrial water, and (ii) treating the first treated industrial water with a corrosion inhibiting-effective amount of a metal-containing treatment program to provide a second treated industrial water, to inhibit corrosion of metal in the system.

(2) In embodiment (2) is presented the method of embodiment (1), wherein the phosphorus-based treatment program comprises an orthophosphate, a condensed phosphate, salts thereof, or a combination thereof.

(3) In embodiment (3) is presented the method of embodiment (1) or (2), wherein the phosphorus-based treatment program comprises pyrophosphate, hexametaphosphate, metaphosphate, polyphosphate, salts thereof, or a combination thereof.

(4) In embodiment (4) is presented the method of embodiment (1) or (2), wherein the phosphorus-based treatment program comprises an organophosphonic acid, an organophosphinic acid, salts thereof, or a combination thereof.

(5) In embodiment (5) is presented the method of embodiment (1) or (2), wherein the phosphorus-based treatment program comprises aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PA-PEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphino succinic oligomer (PSO), salts thereof, or a combination thereof.

(6) In embodiment (6) is presented the method of any one of embodiments (2)-(5), wherein the corrosion inhibiting-effective amount of the phosphorus-based treatment program provides a concentration of from about 1 ppm to about 100 ppm of phosphorus-based compound in the first treated industrial water.

(7) In embodiment (7) is presented the method of any one of embodiments (2)-(6), wherein the corrosion inhibiting-effective amount of the phosphorus-based treatment program provides a concentration from about 5 ppm to about 40 ppm of phosphorus-based compound in the first treated industrial water.

(8) In embodiment (8) is presented the method of any one of embodiments (1)-(7), wherein the metal-containing treatment program comprises a metal-based corrosion inhibitor comprising a metal atom having a phosphate salt water solubility of $1 \times 10^{-7}$ g/L or less.

(9) In embodiment (9) is presented the method of embodiment (8), wherein the metal-based corrosion inhibitor comprises lanthanum, cerium, yttrium, scandium, aluminum, tin, or a combination thereof.

(10) In embodiment (10) is presented the method of embodiment (8), wherein the metal-based corrosion inhibitor comprises a rare earth metal.

(11) In embodiment (11) is presented the method of embodiment (8), wherein the metal-based corrosion inhibitor comprises lanthanum, cerium, yttrium, or a combination thereof.

(12) In embodiment (12) is presented the method of any one of embodiments (1)-(11), wherein the phosphorus-based treatment program and/or the metal-containing treatment program further comprises at least one polycarboxylic acid.

(13) In embodiment (13) is presented the method of embodiment (12), wherein the polycarboxylic acid is a hydroxy polycarboxylic acid.

(14) In embodiment (14) is presented the method of embodiment (12) or (13), wherein the polycarboxylic acid comprises tartaric acid, citric acid, malic acid, ascorbic acid, glucaric acid, coumaric acid, propionic acid, oxobutyric acid, 2,3-pyridinedicaroboxylic acid, 4,5-imidazoledicarboxylic acid, 1,2,3,4-butanetetracarboxylic acid (BTCA), polyepoxysuccinic acid (PESA), salts thereof, or a combination thereof.

(15) In embodiment (15) is presented the method of any one of embodiments (12)-(14), wherein the polycarboxylic acid comprises at least two hydroxyl moieties.

(16) In embodiment (16) is presented the method of any one of embodiments (12)-(15), wherein the polycarboxylic acid comprises tartaric acid or a salt thereof.

(17) In embodiment (17) is presented the method of any one of embodiments (1)-(16), wherein the phosphorus-based treatment program and/or the metal-containing treatment program further comprises a polymer dispersant comprising at least one sulfonic group.

(18) In embodiment (18) is presented the method of embodiment (17), wherein the polymer dispersant comprises at least one monomeric component which is acrylamidomethanesulfonic acid, (dimethyl(2-oxobut-3-en-1-yl)ammonio)methanesulfonate, allyloxypolethoxy(10) sulfonic acid, 2-acrylamido-2-methylpropane sulfonic acid, 2-acrylamido-2-methylbutane sulfonic acid, acrylamide tertbutylsulfonate, 4-(allyloxy)benzenesulfonic acid, styrene sulfonic acid, allyl sulfonic acid, methallyl sulfonic acid, allyl hydroxypropane sulfonic acid, salts thereof, or a combination thereof.

(19) In embodiment (19) is presented the method of embodiment (18), wherein the polymer dispersant further comprises at least one monomeric component which is (meth)acrylamide, (meth)acrylic acid, itaconic acid, maleic anhydride, crotonic acid, acrylamido glycolic acid, salicylic acrylamido glycolic acid, allylmalonic acid dimethyl ester, 2-carboxyethyl acrylate, 3-acrylamido-3-methylbutanoic acid, salts thereof, or a combination thereof.

(20) In embodiment (20) is presented the method of any one of embodiments (12)-(19), wherein the phosphorus-based treatment program and/or the metal-containing treatment program provides a concentration of from about 1 ppm to about 200 ppm of polycarboxylic acid in the first treated industrial water and/or in the second treated industrial water.

(21) In embodiment (21) is presented the method of embodiment (20), wherein the phosphorus-based treatment program and/or the metal-containing treatment program provides a concentration of from about 5 ppm to about 100 ppm of polycarboxylic acid in the first treated industrial water and/or in the second treated industrial water.

(22) In embodiment (22) is presented the method of any one of embodiments (17)-(21), wherein the phosphorus-based treatment program and/or the metal-containing treatment program provides a concentration of from about 1 ppm to about 50 ppm of polymer dispersant in the first treated industrial water and/or in the second treated industrial water.

(23) In embodiment (23) is presented the method of embodiment (22), wherein the phosphorus-based treatment program and/or the metal-containing treatment program provides a concentration of from about 2 ppm to about 20 ppm of polymer dispersant in the first treated industrial water and/or in the second treated industrial water.

(24) In embodiment (24) is presented the method of any one of embodiments (1)-(23), wherein the phosphorus-based treatment program and/or the metal-containing treatment program further comprises silica or a silicate.

(25) In embodiment (25) is presented the method of embodiment (24), wherein the phosphorus-based treatment program and/or the metal-containing treatment program provides a concentration of from about 1 ppm to about 100 ppm of silica or silicate in the first treated industrial water and/or in the second treated industrial water.

(26) In embodiment (26) is presented the method of any one of embodiments (1)-(25), wherein the phosphorus-based treatment program further comprises a scale inhibitor selected from polymaleic acid, poly(methyl)acrylic acid, polyepoxy succinic acid (PESA), polyaspartic acid (PASP), salts thereof, or a combination thereof.

(27) In embodiment (27) is presented the method of any one of embodiments (1)-(26), wherein the metal-containing treatment program further comprises a scale inhibitor selected from polymaleic acid, poly(methyl)acrylic acid, polyepoxy succinic acid (PESA), polyaspartic acid (PASP), aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PAPEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphino succinic oligomer (PSO), salts thereof, or a combination thereof.

(28) In embodiment (28) is presented the method of embodiment (26) or (27), wherein the phosphorus-based treatment program and/or the metal-containing treatment program provides a concentration of from about 1 ppm to about 100 ppm of scale inhibitor in the first treated industrial water and/or in the second treated industrial water.

(29) In embodiment (29) is presented the method of any one of embodiments (1)-(28), wherein the phosphorus-based treatment program and/or the metal-containing treatment program further comprises an azole-based corrosion inhibitor.

(30) In embodiment (30) is presented the method of embodiment (29), wherein the azole-based corrosion inhibitor comprises benzotriazole (BZT), tolyltriazole (TT), 5-methylbenzotriazole (5-MeBT), 4-methylbenzotriazole (4-MeBT), butylbenzotriazole (BBT), pentoxybenzotriazole (POBT), carboxylbenzotriazole (CBT), tetrahydrotolyltriazole (THT), a halogen resistant azole (HRA), salts thereof, or a combination thereof.

(31) In embodiment (31) is presented the method of any one of embodiments (1)-(30), comprising treating the water of the industrial water system with the corrosion inhibiting-effective amount of the phosphorus-based treatment program for a period of from about one day to about three months.

(32) In embodiment (32) is presented the method of embodiment (31), comprising treating the water of the industrial water system with the corrosion inhibiting-effective amount of the phosphorus-based treatment program for a period of from about one day to about one month.

(33) In embodiment (33) is presented the method of embodiment (32), comprising treating the water of the industrial water system with the corrosion inhibiting-effective amount of the phosphorus-based treatment program for a period of from about one day to about two weeks.

(34) In embodiment (34) is presented the method of any one of embodiments (1)-(33), comprising treating the first treated industrial water with the corrosion inhibiting-effective amount of the metal-containing treatment program for a period of from about one day to about three months.

(35) In embodiment (35) is presented the method of embodiment (34), comprising treating the first treated industrial water with the corrosion inhibiting-effective amount of the metal-containing treatment program for a period of from about one day to about one month.

(36) In embodiment (36) is presented the method of embodiment (35), comprising treating the first treated industrial water with the corrosion inhibiting-effective amount of the metal-containing treatment program for a period of from about one day to about two weeks.

(37) In embodiment (37) is presented the method of any one of embodiments (1)-(36), comprising terminating the phosphorus-based treatment program before treating with the metal-containing treatment program.

(38) In embodiment (38) is presented the method of embodiment (37), comprising terminating the phosphorus-based treatment program less than one week prior to treating with the metal-containing treatment program.

(39) In embodiment (39) is presented the method of embodiment (38), comprising terminating the phosphorus-based treatment program less than one day prior to treating with the metal-containing treatment program.

(40) In embodiment (40) is presented the method of any one of embodiments (1)-(36), comprising administering the phosphorus-based treatment program concurrently with the metal-containing treatment program.

(41) In embodiment (41) is presented the method of any one of embodiments (34)-(40), comprising gradually reducing the corrosion inhibiting-effective amount of the metal-containing treatment program over the treatment period of the metal-containing treatment program.

(42) In embodiment (42) is presented the method of any one of embodiments (1)-(41), wherein the industrial water system comprises a cooling water system.

(43) In embodiment (43) is presented the method of embodiment (42), wherein the cooling water system comprises an open loop system, a closed loop system, a passivation system, or a combination thereof.

(44) In embodiment (44) is presented the method of any one of embodiments (1)-(43), wherein the metal comprises stainless steel, alloy steel, galvanized steel, tool steel, mild steel, aluminum, brass, bronze, iron, copper, or a combination thereof.

(45) In embodiment (45) is presented the method of embodiment (44), wherein the metal comprises mild steel, brass, or a combination thereof.

EXAMPLES

The following examples further illustrate the invention but, of course, should not be construed as in any way limiting its scope.

For each of Examples 1-3, corrosion of carbon steel was monitored using linear polarization resistance (LPR) electrochemical analysis in a pilot cooling tower.

The pilot cooling tower was equipped with a Gamry system (PCI4G300), associated with a PINE rotator, which was used to detect and record the electrochemical signals. For these experiments, the reference electrodes (RE) were Ag/AgCl, the counter electrodes (CE) were graphite electrodes, and the working electrodes (WE) were 5 cm$^2$ carbon steel. The corrosion rate was measured in mils per year (mpy), which is a directed representation of the material loss or weight loss of a metal surface due to corrosion.

Example 1

For comparison, this example demonstrates the corrosion inhibition performance exhibited by a phosphorus-based treatment program used in the absence of a metal-containing treatment program.

The performance of the phosphorus-based treatment program used in the absence of the metal-containing treatment program was evaluated using medium water with chemical concentrations summarized in Table 1.

TABLE 1

| Medium Water Concentrations | |
| --- | --- |
| | Medium Water (ppm) |
| Ca (as CaCO$_3$) | 600 |
| Mg (as CaCO$_3$) | 300 |
| M-Alkalinity (as CaCO$_3$) | 200-300 |
| Cl (as ion) | 400-500 |
| SO$_4$ (as ion) | 500-600 |
| SiO$_2$ | 25 |

The pilot cooling tower was started with medium water with the chemical concentrations summarized in Table 1. The medium water was dosed with a phosphate-based treatment program to obtain treated water containing orthophosphate (10 ppm as PO$_4$), pyrophosphate (3 ppm as PO$_4$), and 10 ppm of phosphino succinic oligomer (PSO). In addition, the medium water was dosed with a polymer dispersant to achieve 10 ppm of the polymer dispersant (poly 2-acrylamido-2-methyl-1-propanesulfonic acid; polyAMPS) in the treated water, and the treated water was maintained at a pH of 7.7. The concentrations of orthophosphate, pyrophosphate, and PSO were controlled by 3D TRASAR™ technology (commercially available from Ecolab) and the polymer dispersant was controlled by using a fluorescent tag. The first day of the phosphate-based treatment program was performed without heat (Stage 1—cold passivation stage). On the second day, the pilot cooling tower was heated to 95° F.-105° F. and the phosphate-based treatment program was maintained for seven days (Stage 2).

After the seven days at an elevated temperature, dosing of the phosphate-based program was discontinued, and the concentration of phosphates, which had been previously controlled by 3D TRASAR™ technology, gradually decreased to 0 ppm. The amount of polymer dispersant (poly 2-acrylamido-2-methyl-1-propanesulfonic acid; polyAMPS) in the treated water was reduced to 5 ppm and 15 ppm of a scale inhibitor (polymaleic acid; HPMA) was added to the treated water to control the CaCO$_3$ scale. In addition, the pH was gradually increased from 7.7 to 8.6 to help avoid phosphate-based scale formation.

Figure 1:
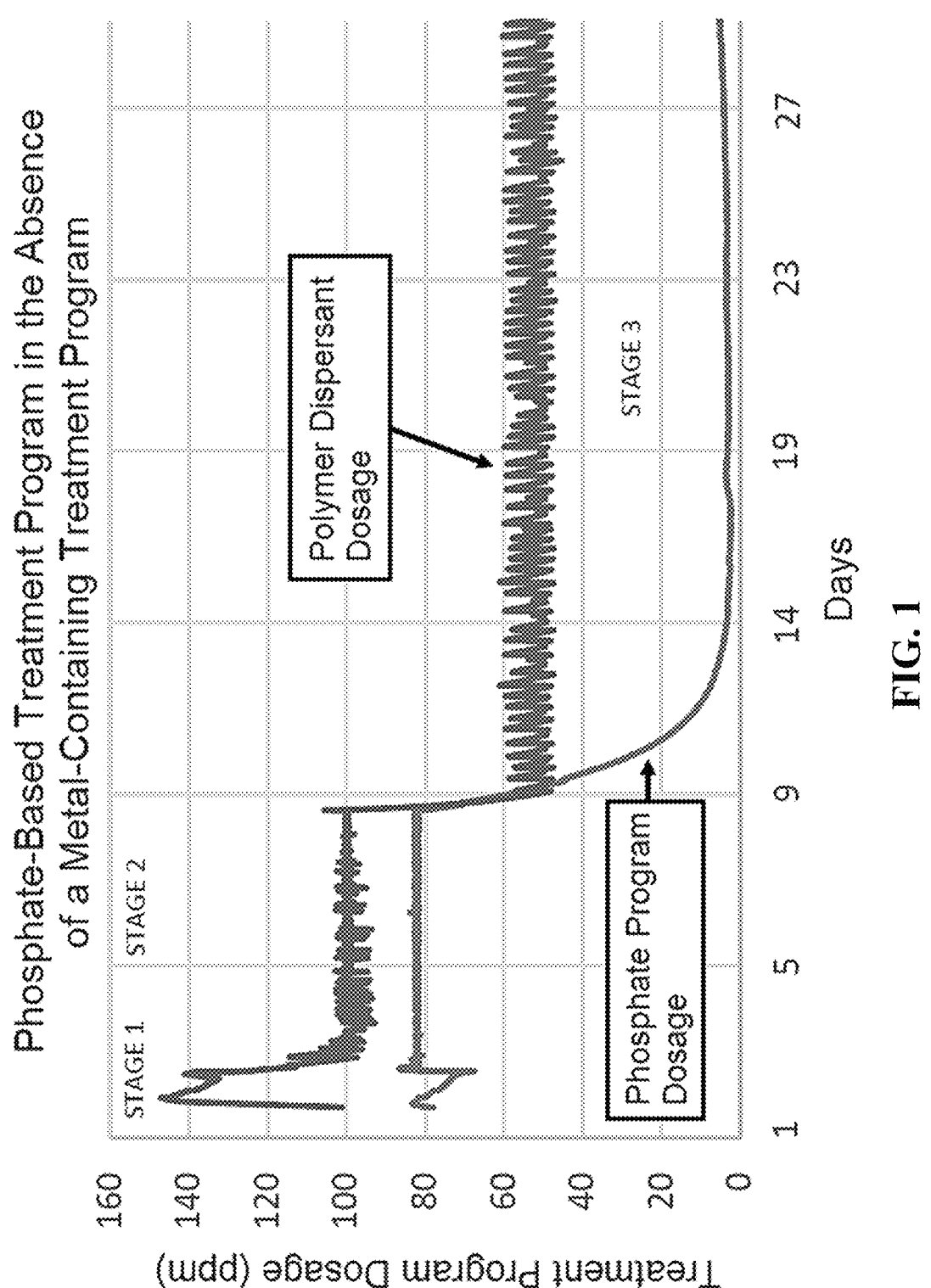
FIG. 1 depicts a time plot summarizing the phosphate program dosage and the polymer dispersant dosage of the phosphate-based treatment program used in the absence of a metal-containing treatment program.

By day 14, the amount of phosphates in the pilot cooling tower had been reduced to 0 ppm, and the system was maintained with 5 ppm polymer dispersant (poly 2-acrylamido-2-methyl-1-propanesulfonic acid; polyAMPS) and 15 ppm scale inhibitor (polymaleic acid; HPMA) for a period of 14 more days (Stage 3). A summary of the phosphate-based treatment program is depicted in FIG. 1.

Daily water analysis was performed on the pilot cooling tower to monitor the M-alkalinity, chloride concentration, sulfate concentration, calcium concentration, magnesium concentration, total phosphate concentration, inorganic phosphate concentration, orthophosphate concentration, silica concentration, chlorine concentration (free and total), iron concentration, and pH, and the results are set forth in FIGS. 2-5.

Figure 2:
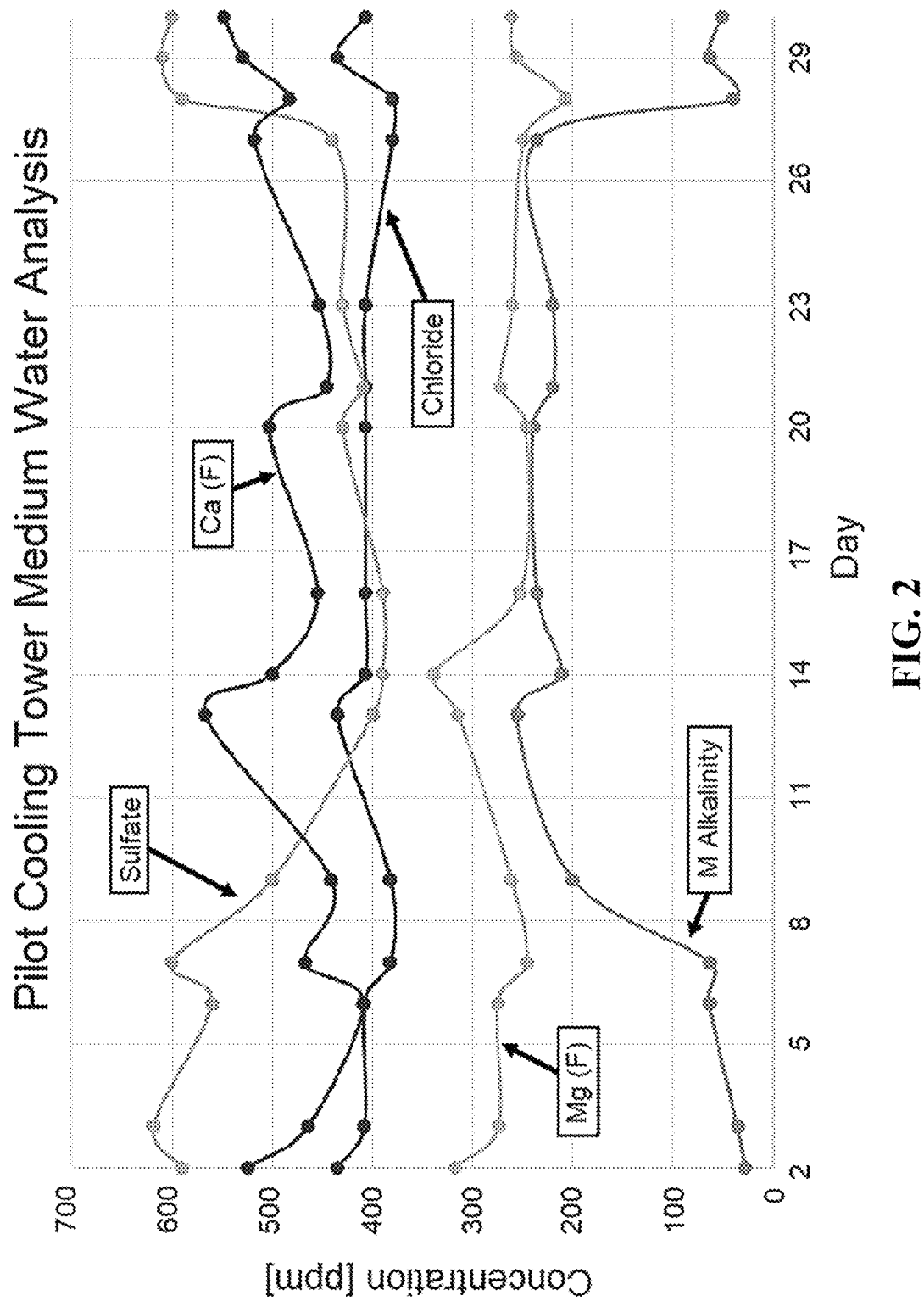
FIG. 2 depicts a time plot showing the M alkalinity concentration, chloride concentration, sulfate concentration, calcium concentration (filtered (F) prior to measurement), and magnesium concentration (filtered (F) prior to measure-

As is apparent from the results set forth in FIG. 2, the chloride concentration, sulfate concentration, calcium concentration (filtered (F) prior to measurement), and magnesium concentration (filtered (F) prior to measurement) remained relatively constant over the course of the pilot cooling tower treatment program.

As is apparent from the results set forth in FIG. 3, the total phosphate concentration (filtered (F) prior to measurement), inorganic phosphate concentration (filtered (F) prior to measurement), and orthophosphate concentration (filtered (F) prior to measurement) decreased to 0 ppm by day 14, 7 days after the phosphate-based treatment program was stopped.

Chlorine can be present in water as free (F) available chlorine and as combined available chlorine. Both forms can exist in the same water and can be determined together as the total (T) available chlorine. Free chlorine may be present as, for example, hypochlorous acid and/or hypochlorite ion, whereas combined chlorine may exist as, for example, monochloramine, dichloramine, nitrogen trichloride and other N-chloro derivatives. Chlorines such as available chlorine and combined available chlorine can be effective biocides. Therefore, most cooling water programs use chlorine compounds to control their bacteria problems. Higher chlorine concentrations can generate more corrosion stress on mild steel tubes. FIG. 4 shows the amount of free chlorine (F) and total chlorine (T) measured during the experiment.

During the first 7 days, while the phosphate-based treatment program was used to maintain the levels of phosphate in the pilot cooling tower, the iron concentration (filtered (F) prior to measurement and unfiltered (U)) in the system gradually decreased from approximately 0.8 ppm to approximately 0.1 ppm. However, after the phosphate-based treatment program was stopped, the iron concentration (filtered (F) prior to measurement and unfiltered (U)) began to increase around day 21, eventually reaching an iron concentration of approximately 0.5 ppm. See FIG. 5.

Mild steel tubes of the pilot cooling tower were qualitatively monitored and the results are set forth in FIG. 6. The first two mild steel tubes shown in FIG. 6 are from photographs taken at the beginning of Stage 3, the second two mild steel tubes shown in FIG. 6 are from photographs taken at the middle of Stage 3, and the last two mild steel tubes shown in FIG. 6 are from photographs taken at the end of Stage 3. As is apparent from the mild steel tubes depicted in FIG. 6, during the phosphate-based treatment program (i.e., the first 7-14 days), the level of corrosion was relatively minimal with only a few small corrosion spots. However, after the phosphate-based treatment program was stopped, the corrosion of the mild steel tubes began to increase, as demonstrated by the last four mild steel tubes shown in FIG. 6.

The qualitative results were confirmed by linear polarization resistance (LPR) electrochemical analysis, as shown in FIG. 7. In particular, the corrosion rate decreased to as low as 0.5 mpy during the phosphate-based treatment program (i.e., the first 7-14 days); however, after the phosphate-based treatment program was stopped, the corrosion rate increased to approximately 2.0 mpy.

These results show that the phosphate-based treatment program was capable of reducing corrosion in the pilot cooling tower while the phosphate-based treatment program was maintained. However, once the level of phosphates decreased to 0 ppm, the corrosion rate began to increase. In other words, the phosphate-based treatment program must be maintained for the entire lifespan of the pilot cooling tower to avoid an increase in the corrosion rate.

Example 2

For comparison, this example demonstrates the corrosion inhibition performance exhibited by a metal-containing treatment program used in the absence of a phosphorus-based treatment program.

The performance of the metal-containing treatment program used in the absence of the phosphorus-based treatment program was evaluated using medium water with chemical concentrations summarized in Table 2.

TABLE 2

| Medium Water Concentrations | |
| --- | --- |
| | Medium Water (ppm) |
| Ca (as CaCO₃) | 600 |
| Mg (as CaCO₃) | 300 |
| M-Alkalinity (as CaCO₃) | 200-300 |
| Cl (as ion) | 400-500 |
| SO₄ (as ion) | 500-600 |
| SiO₂ | 25 |

The pilot cooling tower was started with medium water with the chemical concentrations summarized in Table 2. The medium water was dosed with a passivation program to obtain treated water containing 60 ppm of polymaleic acid (HPMA), 30 ppm of polymer dispersant (poly 2-acrylamido-2-methyl-1-propanesulfonic acid; polyAMPS), 6 ppm of benzotriazole (BZT), and 8 ppm zinc. The passivation program was performed for 1 day without heat (Stage 1—cold passivation stage), and the treated water was maintained at a pH of 7.7.

On day 2, the passivation program was discontinued and the medium water was dosed with a metal-containing treatment program to obtain treated water containing 2.5 ppm of lanthanum, 50 ppm of tartaric acid, 20 ppm of polymaleic acid (HMPA), and 10 ppm of polymer dispersant (poly 2-acrylamido-2-methyl-1-propanesulfonic acid; polyAMPS), and the treated water was maintained at a pH of 8.6. The concentrations of lanthanum and tartaric acid were controlled by 3D TRASAR™ technology (commercially available from Ecolab) and the polymaleic acid and polymer dispersant were controlled by using a fluorescent tag. The pilot cooling tower was heated to 100° F.-110° F. and the metal-containing treatment program was maintained for 17 days (Stage 2).

On day 18, the concentration of the tartaric acid in the treated water was decreased to 25 ppm, and the concentrations of lanthanum, polymaleic acid, and polymer dispersant were maintained at 2.5 ppm, 20 ppm, and 10 ppm, respectively. The reduced dosage of the metal-containing treatment program was maintained for 12 days (Stage 3). A summary of the metal-containing treatment program is depicted in FIG. 8.

Daily water analysis was performed on the pilot cooling tower to monitor the M-alkalinity, chloride concentration, sulfate concentration, calcium concentration, magnesium concentration, chlorine concentration (free and total), iron concentration, zinc concentration, BZT concentration, and silica/nitrate concentration, and the results are set forth in FIGS. 9-11.

As is apparent from the results set forth in FIG. 9, the chloride concentration, sulfate concentration, calcium concentration (filtered (F) prior to measurement), and magnesium concentration (filtered (F) prior to measurement) remained relatively constant over the course of the pilot cooling tower treatment program.

Chlorine can be present in water as free (F) available chlorine and as combined available chlorine. Both forms can exist in the same water and can be determined together as the total (T) available chlorine. Free chlorine may be present as, for example, hypochlorous acid and/or hypochlorite ion, whereas combined chlorine may exist as, for example, monochloramine, dichloramine, nitrogen trichloride and other N-chloro derivatives. Chlorines such as available chlorine and combined available chlorine can be effective biocides. Therefore, most cooling water programs use chlorine compounds to control their bacteria problems. Higher chlorine concentrations can generate more corrosion stress on mild steel tubes. FIG. 10 shows the amount of free chlorine (F) and total chlorine (T) measured during the experiment.

In addition, FIG. 10 shows the amount of iron (filtered (F) prior to measurement) during the experiment. Iron is an indirect way of understanding corrosion control performance besides NCM probe or tube and coupon weight loss analysis. As shown in FIG. 10, the concentration of iron in solution remains relatively constant indicating that the treatment program has little impact on the iron concentration.

As is apparent from the results set forth in FIG. 11, the zinc concentration (filtered (F) prior to measurement), zinc concentration (unfiltered (U)), and BZT concentration decreased to 0 ppm by day 7, 6 days after the passivation program was discontinued.

Mild steel tubes of the pilot cooling tower were qualitatively monitored and the results are set forth in FIG. 12. The first mild steel tube shown in FIG. 12 is from a photograph taken during Stage 1, the second mild steel tube shown in FIG. 12 is from a photograph taken during Stage 2, and the last mild steel tube shown in FIG. 12 is from a photograph taken during Stage 3. As is apparent from the mild steel tubes depicted in FIG. 12, during the passivation program (i.e., the first day), the mild steel tubes were shiny and did not have any corrosion spots. Similarly, during the second stage, i.e., days 2-17 of the metal-containing treatment program, the level of corrosion was relatively minimal with only a few small corrosion spots. However, after the dosage of the metal-containing treatment program was reduced (Stage 3), the corrosion of the mild steel tubes began to increase and showed localized corrosion, as demonstrated by the last mild steel tube shown in FIG. 12.

The qualitative results were confirmed by linear polarization resistance (LPR) electrochemical analysis, as shown in FIG. 13. In particular, the corrosion rate decreased to as low as 0.1 mpy during the metal-containing treatment program (Stage 2); however, after the dosage of the metal-containing treatment program was reduced (Stage 3), the corrosion rate increased to approximately 0.6 mpy.

These results show that the metal-containing treatment program was capable of reducing corrosion in the pilot cooling tower while the metal-containing treatment program was maintained. However, once the dosage of the metal-containing treatment program was reduced (Stage 3), the corrosion rate began to increase. In other words, the metal-containing treatment program must be maintained for the entire lifespan of the pilot cooling tower to avoid an increase in the corrosion rate.

Example 3

This example demonstrates the corrosion inhibition performance exhibited by a phosphorus-based treatment program used in combination with a metal-containing treatment program.

Performance of a phosphorus-based treatment program used in combination with a metal-containing treatment program was evaluated for medium water with chemical concentrations summarized in Table 3.

TABLE 3

| Medium Water Concentrations | |
| --- | --- |
| | Medium Water (ppm) |
| Ca (as $CaCO_3$) | 600 |
| Mg (as $CaCO_3$) | 300 |
| M-Alkalinity (as $CaCO_3$) | 200-300 |
| Cl (as ion) | 400-500 |
| $SO_4$ (as ion) | 500-600 |
| $SiO_2$ | 25 |

Stage 1: The pilot cooling tower was started with medium water with the chemical concentrations summarized in Table 3. The medium water was dosed with a phosphate-based treatment program to obtain treated water containing orthophosphate (10 ppm as $PO_4$), pyrophosphate (3 ppm as $PO_4$), and 10 ppm of phosphino succinic oligomer (PSO). In addition, the medium water was dosed with a polymer dispersant to achieve 16 ppm of the polymer dispersant (poly 2-acrylamido-2-methyl-1-propanesulfonic acid; polyAMPS) in the treated water, and the treated water was maintained at a pH of 7.7. The concentrations of orthophosphate, pyrophosphate, and PSO were controlled by 3D TRASAR™ technology (commercially available from Ecolab) and the polymer dispersant was controlled by using a fluorescent tag. The first day of the phosphate-based treatment program was performed without heat, and on the second day, the pilot cooling tower was heated to 104° F.-114° F. and the phosphate-based treatment program was maintained for seven days.

Stage 2: After seven days of the phosphate-based treatment program, the phosphate-based treatment program was supplemented with a metal-containing treatment program to obtain treated water containing 2.5 ppm of lanthanum, 50 ppm of tartaric acid, 15 ppm of polymaleic acid (HMPA), and 10 ppm of polymer dispersant (poly 2-acrylamido-2-methyl-1-propanesulfonic acid; polyAMPS). The concentrations of lanthanum and tartaric acid were controlled by 3D TRASAR™ technology (commercially available from Ecolab) and the polymaleic acid and polymer dispersant were controlled by using a fluorescent tag. After five days, the phosphate-based treatment program was discontinued. As a result, due to the lower stress of phosphate-based scale, the pH was gradually adjusted from 7.7 to 8.6.

STAGE 3: After discontinuing the phosphate-based treatment program, the metal-containing program (i.e., 2.5 ppm of lanthanum, 50 ppm of tartaric acid, 15 ppm of polymaleic acid (HMPA), and 10 ppm of polymer dispersant (poly 2-acrylamido-2-methyl-1-propanesulfonic acid; polyAMPS)) was maintained for seven days.

STAGE 4: After seven days, the metal-containing treatment program was cut in half to obtain treated water containing 1.25 ppm of lanthanum, 25 ppm of tartaric acid, 7.5 ppm of polymaleic acid (HMPA), and 5 ppm of polymer dispersant (poly 2-acrylamido-2-methyl-1-propanesulfonic acid; polyAMPS).

STAGE 5: After seven days, the 3D TRASAR™ technology (commercially available from Ecolab) controlled portion of the metal-containing treatment program was cut in half to obtain treated water containing 0.625 ppm of lanthanum, 12.5 ppm of tartaric acid, 7.5 ppm of polymaleic acid (HMPA), and 5 ppm of polymer dispersant (poly 2-acrylamido-2-methyl-1-propanesulfonic acid; polyAMPS).

STAGE 6: After seven days, the 3D TRASAR™ technology (commercially available from Ecolab) controlled portion of the metal-containing treatment program was discontinued to eventually obtain treated water containing 0 ppm of lanthanum, 0 ppm of tartaric acid, 7.5 ppm of polymaleic acid (HMPA), and 5 ppm of polymer dispersant (poly 2-acrylamido-2-methyl-1-propanesulfonic acid; polyAMPS). A summary of the phosphorus-based treatment program used in combination with a metal-containing treatment program is depicted in FIG. 14.

Daily water analysis was performed on the pilot cooling tower to monitor the M-alkalinity, chloride concentration, sulfate concentration, calcium concentration, magnesium concentration, total phosphate concentration, inorganic phosphate concentration, orthophosphate concentration, silica concentration, chlorine concentration (free and total), iron concentration, and pH, and the results are set forth in FIGS. 15-18.

As is apparent from the results set forth in FIG. 15, the chloride concentration, sulfate concentration, calcium concentration (filtered (F) prior to measurement), and magnesium concentration (filtered (F) prior to measurement) remained relatively constant over the course of the pilot cooling tower treatment program.

As is apparent from the results set forth in FIG. 16, the total phosphate concentration (filtered (F) prior to measurement), inorganic phosphate concentration (filtered (F) prior to measurement), and orthophosphate concentration (filtered (F) prior to measurement) decreased to 0 ppm by day 14, shortly after the phosphate-based treatment program was discontinued.

Chlorine can be present in water as free (F) available chlorine and as combined available chlorine. Both forms can exist in the same water and can be determined together as the total (T) available chlorine. Free chlorine may be present as, for example, hypochlorous acid and/or hypochlorite ion, whereas combined chlorine may exist as, for example, monochloramine, dichloramine, nitrogen trichloride and other N-chloro derivatives. Chlorines such as available chlorine and combined available chlorine can be effective biocides. Therefore, most cooling water programs use chlorine compounds to control their bacteria problems. Higher chlorine concentrations can generate more corrosion stress on mild steel tubes. FIG. 17 shows the amount of free chlorine (F) and total chlorine (T) measured during the experiment.

FIG. 18 shows the amount of iron (filtered (F) prior to measurement) and unfiltered iron (U) in solution during the experiment. Iron is an indirect way of understanding corrosion control performance besides NALCO™ corrosion monitoring NALCO™ corrosion monitoring (NCM) probe or tube and coupon weight loss analysis. As is apparent from the results set forth in FIG. 18, despite the phosphate-based treatment program being discontinued, the iron concentration remains below 0.3 ppm over the course of Stages 3-6.

Mild steel tubes of the pilot cooling tower were qualitatively monitored and the results are set forth in FIG. 19. The first mild steel tube shown in FIG. 19 is from a photograph taken during Stage 1, the second mild steel tube shown in FIG. 19 is from a photograph taken during Stage 2, the third mild steel tube shown in FIG. 19 is from a photograph taken during Stage 3, the fourth mild steel tube shown in FIG. 19 is from a photograph taken during Stage 4, and the last mild steel tube shown in FIG. 19 is from a photograph taken during Stage 5. As is apparent from the mild steel tubes depicted in FIG. 19, there are small corrosion spots after Stage 1, and the corrosion does not progress over Stages 2-5. In other words, the level of corrosion remains the same over the course of Stages 1-5.

The qualitative results were confirmed by linear polarization resistance (LPR) electrochemical analysis, as shown in FIG. 20. In particular, the corrosion rate was from about 0.5 mpy to about 1.5 mpy during Stage 1. After the metal-containing treatment program was started and the phosphate-based treatment program was discontinued, the corrosion rate decreased to as low as 0.1 mpy and was consistently below 0.5 mpy over the course of Stages 1-6.

These results show that the phosphorus-based treatment program used in combination with a metal-containing treatment program reduced the corrosion as low as 0.1 mpy. In addition, the corrosion rate was consistently below 0.5 mpy over the course of all stages despite the phosphate-based treatment program being discontinued, as well as the metal-containing treatment program being decreased and eventually discontinued. In other words, after administration of the combination of the phosphate-based treatment program and the metal-containing treatment program, the phosphate-based treatment program and/or the metal-containing treatment program can be stopped without the corrosion rate increasing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of inhibiting corrosion of a metal in an industrial water system, the method comprising:

(i) treating water of the industrial water system with a corrosion inhibiting-effective amount of a phosphorus-based treatment program comprising a phosphorus-based compound to provide a first treated industrial water, and (ii) treating the first treated industrial water with a corrosion inhibiting-effective amount of a metal-containing treatment program to provide a second treated industrial water, to inhibit corrosion of metal in the system, wherein the metal-containing treatment program comprises a metal-based corrosion inhibitor comprising lanthanum, cerium, yttrium, scandium, or a combination thereof, and the metal-containing treatment program does not contain zinc.

2. The method of claim 1, wherein the phosphorus-based treatment program comprises an orthophosphate, a condensed phosphate, a salt thereof, or a combination thereof.

3. The method of claim 1, wherein the corrosion inhibiting-effective amount of the phosphorus-based treatment program provides a concentration of from about 1 ppm to about 100 ppm of phosphorus-based compound in the first treated industrial water.

4. The method of claim 1, wherein the phosphorus-based treatment program and/or the metal-containing treatment program further comprises at least one polycarboxylic acid.

5. The method of claim 4, wherein the polycarboxylic acid is a hydroxy polycarboxylic acid.

6. The method of claim 4, wherein the polycarboxylic acid comprises tartaric acid, citric acid, malic acid, ascorbic acid, glucaric acid, coumaric acid, propionic acid, oxobutyric acid, 2,3-pyridinedicaroboxylic acid, 4,5-imidazoledicarboxylic acid, 1,2,3,4-butanetetracarboxylic acid (BTCA), polyepoxysuccinic acid (PESA), a salt thereof, or a combination thereof.

7. The method of claim 4, wherein the phosphorus-based treatment program and/or the metal-containing treatment program provides a concentration of from about 1 ppm to about 200 ppm of polycarboxylic acid in the first treated industrial water and/or in the second treated industrial water.

8. The method of claim 1, wherein the phosphorus-based treatment program and/or the metal-containing treatment program further comprises a polymer dispersant comprising at least one sulfonic group.

9. The method of claim 8, wherein the polymer dispersant comprises at least one monomeric component which is acrylamidomethanesulfonic acid, (dimethyl(2-oxobut-3-en-1-yl)ammonio)methanesulfonate, allyloxypolethoxy(10) sulfonic acid, 2-acrylamido-2-methylpropane sulfonic acid, 2-acrylamido-2-methylbutane sulfonic acid, acrylamide tertbutylsulfonate, 4-(allyloxy) benzenesulfonic acid, styrene sulfonic acid, allyl sulfonic acid, methallyl sulfonic acid, allyl hydroxypropane sulfonic acid, a salt thereof, or a combination thereof.

10. The method of claim 9, wherein the polymer dispersant further comprises at least one monomeric component which is (meth)acrylamide, (meth)acrylic acid, itaconic acid, maleic anhydride, crotonic acid, acrylamido glycolic acid, salicylic acrylamido glycolic acid, allylmalonic acid dimethyl ester, 2-carboxyethyl acrylate, 3-acrylamido-3-methylbutanoic acid, a salt thereof, or a combination thereof.

11. The method of claim 8, wherein the phosphorus-based treatment program and/or the metal-containing treatment program provides a concentration of from about 1 ppm to about 50 ppm of polymer dispersant in the first treated industrial water and/or in the second treated industrial water.

12. The method of claim 1, wherein the phosphorus-based treatment program and/or the metal-containing treatment program further comprises a silica or a silicate.

13. The method of claim 1, wherein the phosphorus-based treatment program further comprises a scale inhibitor selected from polymaleic acid, poly(methyl)acrylic acid, polyepoxy succinic acid (PESA), polyaspartic acid (PASP), a salt thereof, or a combination thereof.

14. The method of claim 13, wherein the phosphorus-based treatment program and/or the metal-containing treatment program provides a concentration of from about 1 ppm to about 100 ppm of scale inhibitor in the first treated industrial water and/or in the second treated industrial water.

15. The method of claim 1, wherein the metal-containing treatment program further comprises a scale inhibitor selected from polymaleic acid, poly(methyl)acrylic acid, polyepoxy succinic acid (PESA), polyaspartic acid (PASP), aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PAPEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphino succinic oligomer (PSO), a salt thereof, or a combination thereof.

16. The method of claim 1, wherein the industrial water system comprises a cooling water system.

17. The method of claim 16, wherein the cooling water system comprises an open loop system, a closed loop system, a passivation system, or a combination thereof.

18. The method of claim 1, wherein the metal comprises stainless steel, alloy steel, galvanized steel, tool steel, mild steel, aluminum, brass, bronze, iron, copper, or a combination thereof.

19. The method of claim 1, wherein the metal-based corrosion inhibitor comprises lanthanum.

20. The method of claim 1, wherein the metal-based corrosion inhibitor comprises yttrium.

\* \* \* \* \*